United States Patent
Estruch Tena et al.

(10) Patent No.: US 11,138,251 B2
(45) Date of Patent: Oct. 5, 2021

(54) SYSTEM TO CUSTOMIZE AND VIEW PERMISSIONS, FEATURES, NOTIFICATIONS, AND UPDATES FROM A CLUSTER OF APPLICATIONS

(71) Applicant: Samsung Electronics Co., Ltd, Suwon-si (KR)

(72) Inventors: Marc Estruch Tena, San Jose, CA (US); Jason Yeh, Sunnyvale, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 315 days.

(21) Appl. No.: 16/130,906

(22) Filed: Sep. 13, 2018

(65) Prior Publication Data
US 2019/0220542 A1    Jul. 18, 2019

Related U.S. Application Data

(60) Provisional application No. 62/617,107, filed on Jan. 12, 2018.

(51) Int. Cl.
*G06F 16/35*    (2019.01)
*G06F 16/16*    (2019.01)
*G06F 16/17*    (2019.01)

(52) U.S. Cl.
CPC ........... *G06F 16/35* (2019.01); *G06F 16/168* (2019.01); *G06F 16/173* (2019.01)

(58) Field of Classification Search
CPC ....... G06F 16/35; G06F 16/173; G06F 16/168
USPC .................................................. 707/737, 738
See application file for complete search history.

(56) References Cited

U.S. PATENT DOCUMENTS

| | | | |
|---|---|---|---|
| 7,130,885 B2 * | 10/2006 | Chandra | G06Q 10/10 709/206 |
| 9,244,700 B2 | 1/2016 | Gujarathi et al. | |
| 9,729,542 B2 | 8/2017 | Jayanti Venkata et al. | |
| 9,778,837 B2 | 10/2017 | Shepherd et al. | |
| 9,838,971 B1 | 12/2017 | Liu et al. | |

(Continued)

FOREIGN PATENT DOCUMENTS

| | | |
|---|---|---|
| KR | 10-2012-0070311 A | 6/2012 |
| KR | 10-2013-0107548 A | 2/2013 |

(Continued)

OTHER PUBLICATIONS

ISA/KR, "International Search Report and Written Opinion of the International Searching Authority," International Application No. PCT/KR2019/000372, dated Apr. 23, 2019, 7 pages.

*Primary Examiner* — James Trujillo
*Assistant Examiner* — Fariborz Khoshnoodi

(57) ABSTRACT

A method, an electronic device, and computer readable medium is provided. The method includes generating a cluster that includes at least one application. The method also includes identifying a set of features (i.e., a set of one or more features) associated with each of the at least one application included within the generated cluster. The method further includes receiving a request to modify a subset of features (i.e., a subset of one or more features) of the identified set of features. The method additionally includes modifying the subset of features associated with each of the at least one application within the generated cluster based on the received request to modify.

20 Claims, 12 Drawing Sheets

(56) References Cited

U.S. PATENT DOCUMENTS

| | | | |
|---|---|---|---|
| 2009/0182836 A1* | 7/2009 | Aviles | H04L 67/2819 709/213 |
| 2012/0072905 A1* | 3/2012 | Traversat | G06F 8/60 717/177 |
| 2012/0144135 A1* | 6/2012 | Aronovich | G06F 12/08 711/162 |
| 2012/0159524 A1 | 6/2012 | Kim | |
| 2012/0191724 A1* | 7/2012 | Tucek | G06F 16/27 707/747 |
| 2013/0055411 A1 | 2/2013 | Yang et al. | |
| 2013/0219176 A1* | 8/2013 | Akella | H04L 63/0435 713/165 |
| 2014/0292666 A1* | 10/2014 | Shi | G06F 21/32 345/173 |
| 2014/0324873 A1 | 10/2014 | Lee | |
| 2015/0007157 A1 | 1/2015 | Park et al. | |
| 2015/0128079 A1 | 5/2015 | Kim et al. | |
| 2015/0261846 A1* | 9/2015 | Hall | G06F 17/18 707/738 |
| 2016/0050209 A1 | 2/2016 | Govande et al. | |
| 2017/0013460 A1* | 1/2017 | Boss | G06F 21/606 |
| 2017/0192772 A1* | 7/2017 | Islam | G06F 8/65 |
| 2017/0277400 A1 | 9/2017 | Lee et al. | |
| 2017/0357425 A1 | 12/2017 | Smith et al. | |
| 2018/0211055 A1* | 7/2018 | Balijepalli | G06F 21/335 |
| 2019/0220542 A1* | 7/2019 | Estruch Tena | G06F 21/604 |

FOREIGN PATENT DOCUMENTS

| | | |
|---|---|---|
| KR | 10-1285394 B1 | 8/2013 |
| KR | 10-2015-0051663 A | 5/2015 |
| KR | 10-1554181 B1 | 9/2015 |
| KR | 10-1593660 B1 | 2/2016 |

\* cited by examiner

SYSTEM TO CUSTOMIZE AND VIEW PERMISSIONS, FEATURES, NOTIFICATIONS, AND UPDATES FROM A CLUSTER OF APPLICATIONS

CROSS-REFERENCE TO RELATED APPLICATION AND CLAIM OF PRIORITY

This application claims priority under 35 U.S.C. § 119(e) to U.S. Provisional Patent Application No. 62/617,107 filed on Jan. 12, 2018. The above-identified provisional patent application is hereby incorporated by reference in its entirety.

TECHNICAL FIELD

This disclosure relates generally to an electronic computing device including a graphical user interface. More specifically, this disclosure relates to creating a cluster of applications where features and information associated with the applications are collectively modifying and gathered.

BACKGROUND

The use of mobile computing technology such as a portable electronic device has greatly expanded largely due to their usability, convenience, computing power, and the like. One result of the recent technological development is that electronic devices are becoming more compact, while the number of functions performed by a given device, such as features of the electronic device, is increasing. With the rise of mobile computing technology, many program and applications are designed specifically for various electronic devices including portable electronic devices. Many of the program and applications can be granted access to various features of the electronic device, via permissions. When a feature is enabled by a permission, the application can access and in some circumstances control certain components, settings, and information associated with the device. When a feature is disabled, such as when a permission is revoked, the application is denied access to the specific feature.

SUMMARY

This disclosure provides a system to customize and view permissions, features, notifications, and updates from a cluster of applications.

In one embodiment, a method is provided. The method includes generating a cluster that includes at least one application. The method also includes identifying a set of features (i.e., a set of one or more features) associated with each of the at least one application included within the generated cluster. The method further includes receiving a request to modify a subset of features (i.e., a subset of one or more features) of the identified set of features. The method additionally includes modifying the subset of features associated with each of the at least one application within the generated cluster based on the received request to modify.

In another embodiment, an electronic device is provided. The electronic device includes at least one processor. The at least one processor is configured to generate a cluster that includes at least one application. The at least one processor is also configured to identify a set of (one or more) features associated with each of the at least one application included within the generated cluster. The at least one processor is further configured to receive a request to modify a subset of (one or more) features of the identified set of features. The at least one processor is additionally configured to modify the subset of features associated with each of the at least one application within the generated cluster based on the received request to modify.

In another embodiment, a non-transitory computer readable medium embodying a computer program is provided. The computer program includes computer readable program code that, when executed by at least one processor of an electronic device, causes the at least one processor to generate a cluster that includes at least one application; identify a set of (one or more) features associated with each of the at least one application included within the generated cluster; receive a request to modify a subset of (one or more) features of the identified set of features; and modify the subset of features associated with each of the at least one application within the generated cluster based on the received request to modify.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
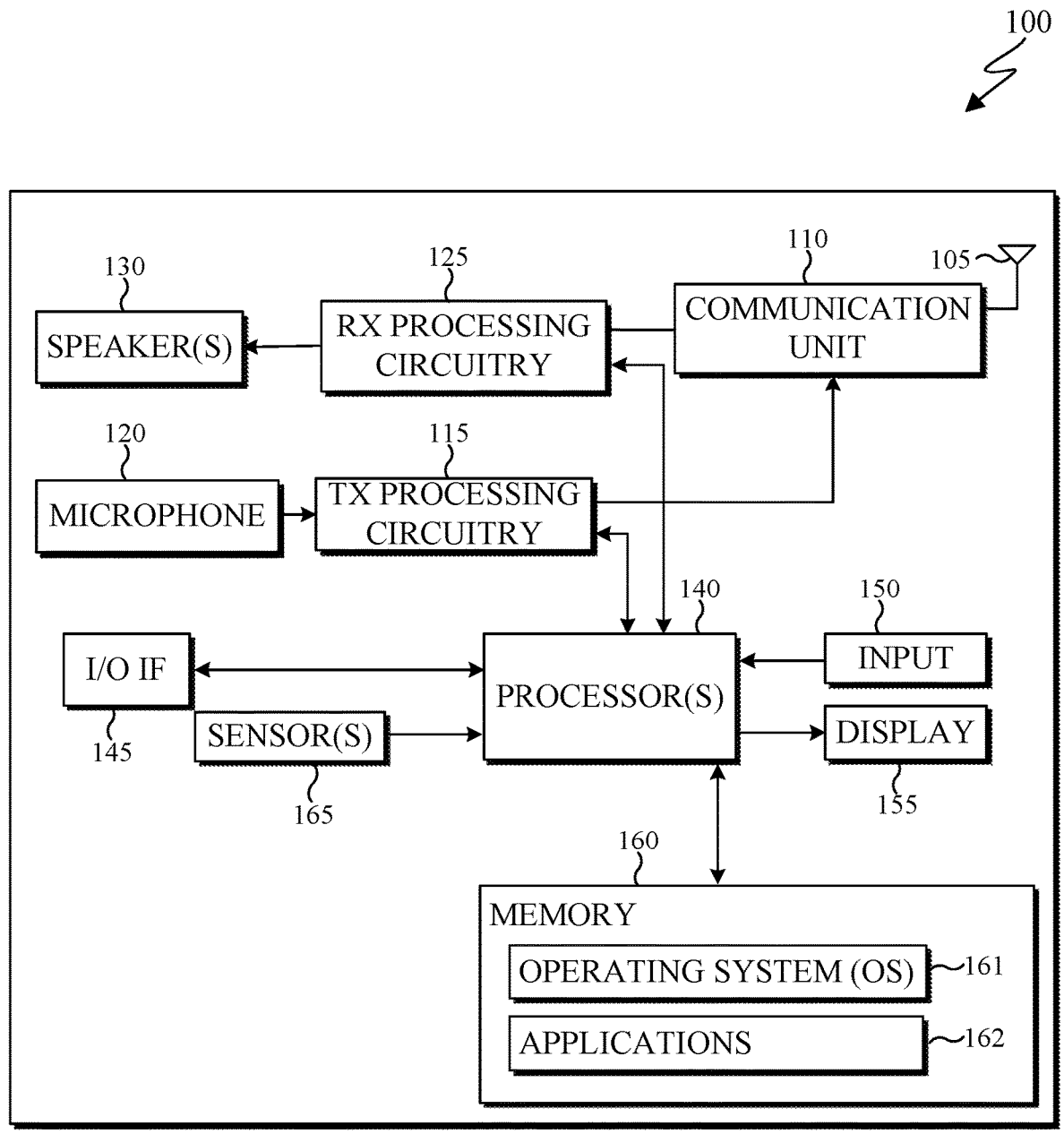
FIG. 1 illustrates an example electronic device in accordance with an embodiment of this disclosure.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

According to embodiments of the present disclosure, content displayed on a display screen of an electronic device can include information such as notifications and updates to applications. Content displayed on a display screen of an electronic device can also include interface objects such as, icons, images, videos, control elements such as buttons, other graphics, and the like. A user can interact with the user interface objects via a user input device, such as a keyboard, mouse, and a touchpad. If the display includes a touch panel, such as a touchscreen display, a user can interact with the content displayed on the electronic device by simply touching the display via a finger of the user or a stylus. A user can interact with one or more of the user interface objects displayed on the display screen. For example, a user can select an icon of a particular application to open or activate the application. It is noted that as used herein, the term "user" may denote a human or another device (e.g., an artificial intelligent electronic device) using the electronic device.

Certain electronic devices include a graphical user interface (GUI) such as a display that allows a user to view information displayed on the display and interact with the electronic device. Various portable electronic devices can also include a user input device such as a touch screen panels that can be used in combination with the GUI. Touch screens allow a user to interact with the electronic device via touching the display screen itself. For example, if a user touches text, graphics, or icons displayed on the touch screen with a finger or stylus, the electronic device detects the selection of the user based on the location, situation, and type of touch.

An electronic device, according to embodiments of the present disclosure, can include personal computers (such as a laptop, a desktop), a workstation, a server, a television, an appliance, and the like. Additionally, the electronic device can be at least one of a part of a piece of furniture or building/structure, an electronic board, an electronic signature receiving device, a projector, or a measurement device. In certain embodiments, the electronic device can be a portable electronic device such as a portable communication device (such as a smartphone or mobile phone), a laptop, a tablet, an electronic book reader (such as an e-reader), a personal digital assistants (PDAs), a portable multimedia player (PMPs), a MP3 player, a mobile medical device, a virtual reality headset, a portable game console, a camera, and a wearable device, among others. The electronic device is one or a combination of the above-listed devices. Additionally, the electronic device as disclosed herein is not limited to the above-listed devices, and can include new electronic devices depending on the development of technology.

Various programs and applications associated with mobile computing and electronic devices are designed specifically for certain types of electronic devices, such as tablets, personal computers, smart phones, and the like. For example, an application is a program that runs on an electronic device. Applications can include an icon that is used for launching the application and can provide a condensed image that indicates to the user of the electronic device what the application is.

Applications (i.e., "apps") that are used on electronic devices such as phones and tablets often require a user to grant one or more permissions in order for the applications to access information or features on the mobile device. Information can include updates to applications on the electronic device. Information also includes notifications such as push notifications, and information feeds. Features include both hardware components, and settings of the electronic device that the application can access. An application can be granted permission to one or more features of the electronic device when the application is launched for the first time. Thereafter, a user can modify particular features that the application can access on a per-application basis, a per-feature basis, or on a system wide basis. Within a per-application basis, a user can modify a permission that a single application can access. Within a per-feature basis, a user modifies a single feature by changing a permission that either grants or denies access for all the applications on the electronic device to that feature. A system wide basis can modify multiple permissions that all application can access by changing a single setting on the electronic device, such as when the electronic device is in a 'do not disturbed' mode or an 'airplane mode.'

Permissions grant or deny authorization for an application to access various features and information of the electronic device. There are multiple types of features associated with the electronic device. For example, a location feature allows an application to receive information about the location of the electronic device. The location information can be an approximate location based on network location or a precise location based on the Global Navigation Satellite Systems (GNSS) that provides Global Positioning System (GPS). A phone status feature allows an application to identify when a phone call is received or sent, the ability to listen to the phone call, and identify whether the phone is currently active such as when the user is on a phone call. Another feature can allow an application to read and modify the list of contacts on the electronic device. Permissions can also be granted or denied that allow applications to access certain features such as (i) battery statistics of the electronic device, (ii) receive and transmit information over cellular data, WI-FI, BLUETOOTH, Near Field Communication (NFC), infrared (IR), and the like, (iii) access to the calendar, call logs, message logs (such as sender and recipient and a timestamp), content within the messages, and the like, (iv) access to other user accounts, such as email, social medial, and the like, (v) access to sensors associated with the electronic device, such as a biometric sensors (including heart rate monitor, finger print reader, and the like) a flash light, (vi) access to the camera, the microphone, the speaker and the like, (vii) the ability to change or alter the time or time zone the electronic device is located in, (viii) access to saved data, such as documents, images, videos, sound recordings, and the like, both locally and externally, to name a few.

Embodiments of the present disclosure recognize and take into consideration that certain electronic devices lack the ability to easily control the permissions of a subset of applications permanently. Controlling a permission permanently includes changing access to the particular feature on the electronic device, which remains in the changed state until the feature is manually changed by the user in the future. Embodiments of the present disclosure also recognize and take into consideration that certain electronic devices lack the ability to easily control the permissions for a subset of applications temporarily. Controlling a permission temporarily includes changing access to the particular feature on the electronic device, which remains in the changed state until the feature revers back to its previous state based on an occurrence of an event. Embodiments of the present disclosure additionally recognize and take into consideration that certain electronic devices lack the ability for a user to quickly determine specific permissions or features an application can access. For example, in order to change a permission, a user navigates through multiple menus and can often only modify permissions associated with one application at a time. In another example, to change a permission or feature, the user navigates through multiple menu options in order to access the ability to change preset permissions associated with the application. A permission that was granted when the application was installed on the electronic device can lead to wasted resources, such as battery loss, data usage, as well as create various security and privacy risks. For example, if an application is given permission to identify a location of the electronic device, the application can track the user through the electronic device without the user aware that the location tracking feature is active.

Additionally, embodiments of the present disclosure recognize and take into consideration that, certain electronic devices receive a multitude of notifications for the applications. The electronic device then aggregates all the notifications in a single location. Notifications can include feeds of information, push notifications, update notifications, and the like. As a result, a user browses and reads through all the notifications in order to view a notification of interest.

Therefore, embodiments of the present disclosure provide systems and methods for creating one or more clusters where each cluster includes one or more applications. The applications within the cluster are considered a subset of the applications of the electronic device. A user is able to adjust one or more permission associated with the applications within the cluster. That is, altering one or more permissions applies the altered permission(s) to all the applications within the cluster that access the modified features. Similarly, information is aggregated for the applications within each cluster instead of a system wide basis. For example, notifications within each cluster of applications can be customized, allowing only certain notifications to be displayed to the user. In another example, notifications that are received for applications within a cluster are grouped within each respective cluster. It is noted that any application that is not within a cluster and receives a notification, the notification is still aggregated in a single location.

Embodiments of the present disclosure provide an electronic device and methods for modifying a permission, feature, or information for a subset of applications without the need to modify each application one at a time or perform a system wide change. Modifying a permission, feature, or information for each application one at a time can be cumbersome to a user. Similarly, performing a system wide change can affect applications over the desired intent. Embodiments of the present disclosure provide an electronic device and methods for temporarily as well as permanently changing permissions of various features or information. For example, the electronic device can enable or disable various permissions based on various criteria, such as the location of the electronic device, a scheduled event, an activity, and the like.

FIG. 1 illustrates an electronic device 100 in accordance with an embodiment of this disclosure. The embodiment of the electronic device 100 shown in FIG. 1 is for illustration only and other embodiments could be used without departing from the scope of this disclosure. The electronic device 100 can come in a wide variety of configurations, and FIG. 1 does not limit the scope of this disclosure to any particular implementation of an electronic device.

The electronic device 100 can be a mobile communication device, such as, for example, a mobile station, a subscriber station, a wireless terminal, a desktop computer, a portable electronic device such as a mobile device, a PDA, a laptop computer, a tablet computer, a wearable device, and the like. In certain embodiments, the electronic device 100 is a smart phone that includes a GUI that and one or more applications or programs installed thereon.

As shown in FIG. 1, the electronic device 100 includes an antenna 105, a communication unit 110, a transmit (TX)

processing circuitry 115, a microphone 120, and a receive (RX) processing circuitry 125. The communication unit 110 can include, for example, a RF transceiver, a BLUETOOTH transceiver, a WI-FI transceiver, ZIGBEE, infrared, and the like. The electronic device 100 also includes a speaker 130, a processor 140, an input/output (I/O) interface (IF) 145, an input 150, a display 155, a memory 160, and a sensor(s) 165. The memory 160 includes an operating system (OS) 161 and one or more applications 162.

The communication unit 110 receives, from the antenna 105, an incoming RF signal transmitted such as a BLUETOOTH or WI-FI signal from an access point (such as a base station, WI-FI router, Bluetooth device) of a network (such as a WI-FI, Bluetooth, cellular, 5G,LTE, LTE-A, WiMAX, or any other type of wireless network). The communication unit 110 down-converts the incoming RF signal to generate an intermediate frequency or baseband signal. The intermediate frequency or baseband signal is sent to the RX processing circuitry 125 that generates a processed baseband signal by filtering, decoding, or digitizing the baseband or intermediate frequency signal, or a combination thereof. The RX processing circuitry 125 transmits the processed baseband signal to the speaker 130 (such as for voice data) or to the processor 140 for further processing, such as for web browsing data.

The TX processing circuitry 115 receives analog or digital voice data from the microphone 120 or other outgoing baseband data from the processor 140. The outgoing baseband data can include web data, e-mail, or interactive video game data. The TX processing circuitry 115 encodes, multiplexes, digitizes, or a combination thereof, the outgoing baseband data to generate a processed baseband or intermediate frequency signal. The communication unit 110 receives the outgoing processed baseband or intermediate frequency signal from the TX processing circuitry 115 and up-converts the baseband or intermediate frequency signal to an RF signal that is transmitted via the antenna 105.

The processor 140 can include one or more processors or other processing devices and execute the OS 161 stored in the memory 160 in order to control the overall operation of the electronic device 100. For example, the processor 140 could control the reception of forward channel signals and the transmission of reverse channel signals by the communication unit 110, the RX processing circuitry 125, and the TX processing circuitry 115 in accordance with well-known principles. The processor 140 is also capable of executing other applications 162 resident in the memory 160. The processor 140 is capable of creating a cluster of applications 162 and controlling which features of the electronic device 100, the applications within each cluster can access. Example, applications 162 include business, calendars, email clients, finance, games, health/fitness, maps/navigation, photography, shopping, travel, utilities, weather, and the like.

Applications 162 can be a repository for multiple applications that are accessible by the electronic device 100. In certain embodiments, one or more applications or programs installed on the electronic device 100. Each of the applications installed on the electronic device 100 can be stored in a locally or remotely. For example, an application can be stored in a memory, such as memory 160 (such as applications 162) or located remotely and accessed via the communication unit 110. The applications installed on the electronic device 100 can access one or more features of the electronic device.

The processor 140 can execute instructions that are stored in a memory 160. The processor 140 can include any suitable number(s) and type(s) of processors or other devices in any suitable arrangement. For example, in some embodiments, the processor 140 includes at least one microprocessor or microcontroller. Example types of processor 140 include microprocessors, microcontrollers, digital signal processors, field programmable gate arrays, application specific integrated circuits, and discreet circuitry The processor 140 is also capable of executing other processes and programs resident in the memory 160, such as operations that receive, store, and timely instruct by providing image capturing and processing. The processor 140 can move data into or out of the memory 160 as required by an executing process. In some embodiments, the processor 140 is configured to execute a plurality of applications 162 based on the OS 161 or in response to signals received from a cellular base stations or eNodeBs (eNBs) or an operator. The processor 140 is also coupled to the I/O interface 145 that provides the electronic device 100 with the ability to connect to other devices. For example, the electronic device can connect to and receive applications, such as applications 162, from an external device such as a server that contains a repository of applications. The I/O interface 145 is the communication path between these accessories and the processor 140.

The processor 140 is also coupled to the input 150 and the display 155. The operator of the electronic device 100 can use the input 150 to enter data or inputs into the electronic device 100. Input 150 can be a keyboard, touch screen, mouse, track ball, voice input, or other device capable of acting as a user interface to allow a user in interact with electronic device 100. For example, the input 150 can include voice recognition processing thereby allowing a user to input a voice command. For another example, the input 150 can include a touch panel, a (digital) pen sensor, a key, or an ultrasonic input device. The touch panel can recognize, for example, a touch input in at least one scheme among a capacitive scheme, a pressure sensitive scheme, an infrared scheme, or an ultrasonic scheme. Input 150 can be associated with sensor(s) 165 and/or a camera by providing additional input to processor 140. The input 150 can also include a control circuit. In the capacitive scheme, the input 150 can recognize touch or proximity. The display 155 can be a liquid crystal display (LCD), light-emitting diode (LED) display, organic LED (OLED), active matrix OLED (AMOLED), or other display capable of rendering text and/or graphics, such as from websites, videos, games, images, and the like.

The memory 160 is coupled to the processor 140. Part of the memory 160 could include a random access memory (RAM), and another part of the memory 160 could include a Flash memory or other read-only memory (ROM).

The memory 160 can include persistent storage (not shown) that represents any structure(s) capable of storing and facilitating retrieval of information (such as data, program code, and/or other suitable information on a temporary or permanent basis). The memory 160 can contain one or more components or devices supporting longer-term storage of data, such as a ready only memory, hard drive, Flash memory, or optical disc.

Electronic device 100 further includes one or more sensor (s) 165 that can meter a physical quantity or detect an activation state of the electronic device 100 and convert metered or detected information into an electrical signal. For example, sensor 165 can include one or more buttons for touch input, a camera, an optical sensor, a gesture sensor, an inertial/motion sensors (such as a gyroscope or gyro sensor and an accelerometer), an air pressure sensor, a magnetic sensor or magnetometer, a grip sensor, a proximity sensor, altimeter, a color sensor, a bio-physical sensor (such as a heart rate sensor), a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, and the like. The sensor 165 can further include a control circuit for controlling at least one of the sensors included therein. Any of these sensor(s) 165 can be located within the electronic device 100.

Although FIG. 1 illustrates one example of the electronic device 100, various changes can be made to FIG. 1. For example, various components in FIG. 1 could be combined, further subdivided, or omitted and additional components could be added according to particular needs. As a particular example, the processor 140 could be divided into multiple processors, such as one or more central processing units (CPUs) and one or more graphics processing units (GPUs). In addition, as with computing and communication networks, electronic devices and servers can come in a wide variety of configurations and FIG. 1 does not limit this disclosure to any particular electronic device or server.

Figure 2:
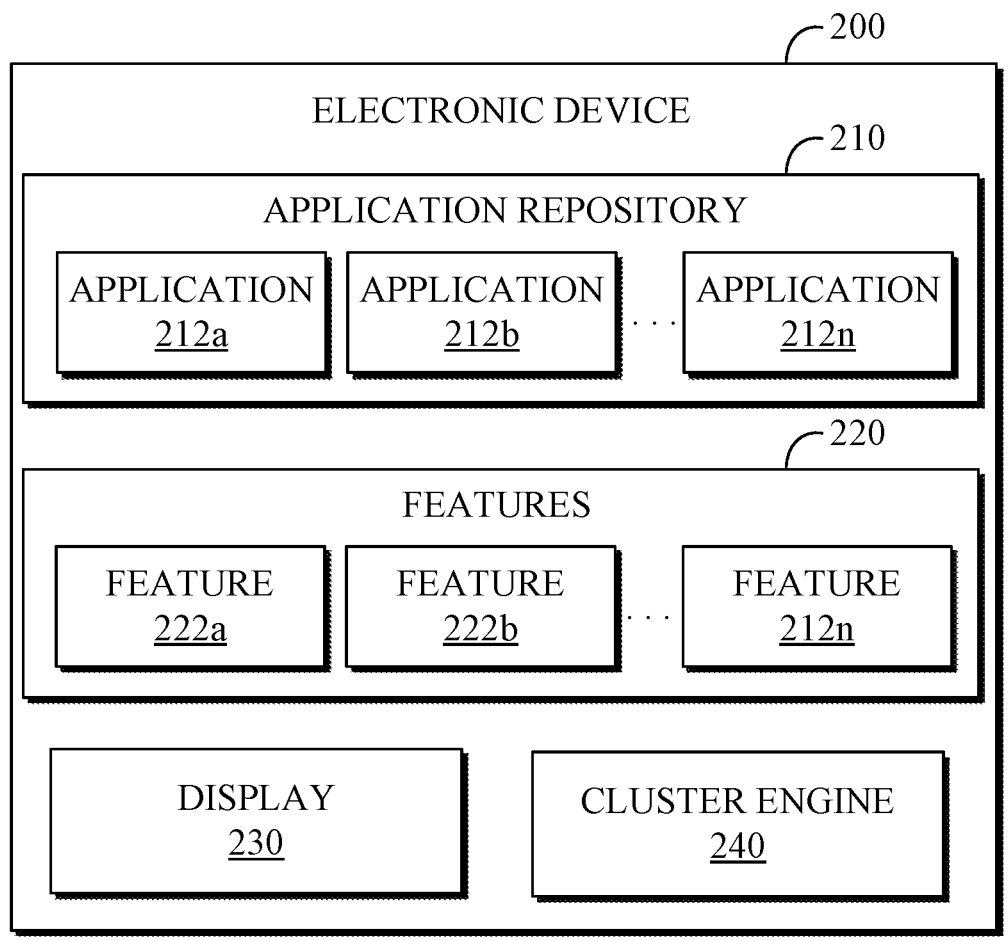
FIG. 2 illustrates an example block diagram of an electronic device in accordance with an embodiment of this disclosure.

FIG. 2 illustrates an example block diagram of an electronic device 200 in accordance with an embodiment of this disclosure. The embodiment of the electronic device 200 shown in FIG. 2 is for illustration only. Other embodiments can be used without departing from the scope of the present disclosure.

The electronic device 200 illustrates a high-level overview of an embodiment of the present disclosure. The electronic device 200 can generate a cluster of applications and modify features of the applications within the generated cluster. The electronic device 200 can include internal components similar to the electronic device 100 of FIG. 1. In certain embodiments, the electronic device 200 can be similar to a smart phone, a head mounted display, a wearable device, a desktop computer, a laptop computer, a tablet computer, and the like. Additional examples of the electronic device 200 includes a cellular phone, a PDA, an image sensing device such as a digital camera, a gaming device, a music storage and playback device, a household appliance capable of wireless Internet access and web browsing, and a portable unit or terminal integrating the functions of the aforementioned items. The electronic device 200 includes an application repository 210, features 220, a display 230, and a cluster engine 240.

In certain embodiments, electronic device 200 is connected to one or more servers to download and receive applications, notifications, information, update information for applications installed on the electronic device 200, and the like. For example, the electronic device 200 can include components allowing the electronic device 200 to access one or more networks. The electronic device 200 can access networks in order to acquire an application from one or more application manufacturers or developers. The network can be personal area network (PAN), Local Area Networks (LANs), Wireless Local Area Networks (WLANs), the Internet, the Public Switched Telephone Network (PSTN), as well as other wireless networks. The network may also be the Internet representing a worldwide collection of networks and gateways that use Transmission Control Protocol/Internet Protocol (TCP/IP) protocols to communicate with one another. The network can include a cable, a router, switches a firewall, or a combination thereof. The network can include a variety of connections, such as, wired, wireless or fiber optic connections.

Application manufacturers or developers develop applications that can be used on the electronic device 200. In certain embodiments, the electronic device 200 includes an application repository 210 that is a repository of one or more applications. The application repository 210 can be similar to memory 160 of FIG. 1 and include applications (such as applications 212a-212n) similar to applications 162 of FIG. 1. The application repository 210 can store applications received from one or more application manufacturers or developers. The application repository 210 can include any number of applications such as application 212a, application 212b, through application 212n (collectively applications 212a-212n). For example, the application repository 210 can include only one application, such as the application 212a.

The applications 212a-212n can be any type of application, such as business related, calendars, email, finance, games, health/fitness, maps/navigation, photography, shopping, travel, utilities, weather, and the like. Each of the applications 212a-212n can utilize one or more features 220 of the electronic device 200. The applications 212a-212n are granted a permission to utilize each of the one or more features 220 of the electronic device 200. Similarly, the features 220 can include any external service that the applications 212a-212n access to provide information to the user. The features 220 can include any number of features such as feature 222a, feature 222b, through feature 222n (collectively features 222a-222n).

Features 222a-222n can be any feature that is utilized by any of the applications 212a-212n. Different applications 212a-212n can access similar or different features 220. In certain embodiments, any of the applications 212a-212n can utilize the same feature, such as feature 222a. For example, two or more applications, such as application 212a and application 212b can utilize the same feature, such as feature 222a. Any of the applications 212a-212n can utilize (i) separate features, (ii) a combination of some individual features, and (iii) overlapping features. For example, the feature 222a and the feature 222b can be accessed by the application 212a, while other features (such as feature 222c, not shown) can be accessed by the application 212b, and a third application can access a mixture of the features accessed by the application 212a and the application 212b as well as features not accessed by the application 212a and the application 212b.

The features 220 can include processing resources, power resources, memory resources, as well as accessories associated with the electronic device 200. Accessories associated with the electronic device 200 include components that are peripheral to the electronic device 200 such as external memory, or remote sensors. The features 220 can include a camera, a light (such as a flashlight), a microphone (such as microphone 120 of FIG. 1), a speaker (such as speaker 130 of FIG. 1), and any sensor (such as sensor 165 of FIG. 1) including biometric sensors and motion sensors. The features 220 can also include internal and external storage (such as memory 160 of FIG. 1) including phone logs, message logs, content of messages, emails, images, browser history, bookmarks, calendar events, social media history, and the like. The features 220 can additionally include, a communication receiver, transmitter, or transceiver, (such as the communication unit 110 of FIG. 1), that can communicate over different frequencies or protocols such as WI-FI, BLUETOOTH, NFC, IR, and the like. The features 220 can include location services, such as GPS.

Controlling which of the applications 212a-212n can access which of the features 220 is based on a feature by feature basis, an application by application basis, or a system wide basis. When multiple features are utilized by one or more of the applications 212a-212n, the performance of the electronic device 200 can be reduced or privacy of the user can be exploited. For example, when an application continually accesses cellular data, the battery of the device can drain quicker and the user can incur fees if a data provider limits the quantity of data sent and received over cellular data. For instance, a data plan governed by a service provider can allot a predefined quantity of data to be transmitted and received. An application, such as application 212a, that is given access to freely transmit and receive data can reduce the resources provided in accordance with the data plan. In another example, privacy can be exploited when a developer of an application is to be given access to features the user does not want to share with the developer, such as location data of the electronic device 200. In another example, the more features that are used by each of the applications 212a-212n, the more electricity is used or the quicker the electricity stored within a battery of the electronic device 200 is diminished.

The applications 212a-212n can be displayed on the display 230. The display 230 can be similar to the display 155 of FIG. 1. A user can interact with each of the applications 212a-212n through a user interface. In certain embodiments, the user interface is a GUI. The input can be received on a touch screen or a user input device such as a mouse, keyboard or any other input similar to input 150 of FIG. 1.

In certain embodiments, display 230 is a single display affixed to the electronic device 200. The display 230 can be similar to a display screen on mobile device, or a display screen on a computer or tablet. In certain embodiments, display 230 is a user interface allowing the user to provide one or more inputs with respect to the applications 212a-212n. By displaying a user interface on the display 230, a user can input particular instructions that control the various features 220 the applications 212a-212n access. Other user inputs indicate a subset of the applications 212a-212n to be included in a single cluster.

The cluster engine 240 generates a cluster of applications selected from the applications 212a-212n. The cluster engine 240 also manipulates which features 220 the applications within the cluster can access. The cluster engine 240 enables a user to define a cluster of the applications 212a-212n. For example, a user can select particular applications to be included in a cluster. The cluster engine 240 can automatically create a cluster of applications. For example, the cluster engine 240 can suggest at least one particular application to include in a cluster based on the applications including similar features, how often the user accesses the particular application(s), applications already located in a folder on the GUI where the folder includes one or more applications, a semantic analysis of the name of the folder or the applications, and the like. The cluster engine 240 groups receive information, such as news feeds, updates, notifications associated with the applications within a cluster in one location. The cluster engine 240 applies a modification to a feature to all the applicable applications within the cluster, such as enabling or disabling the applications from accessing the feature. In certain embodiments, the modification to a permission is applied temporarily. In certain embodiments, the modification is maintained until changed by a user. The cluster engine 240 also displays applications within a cluster and can provide quick access to applications.

In certain embodiments, the cluster engine 240 creates a cluster that includes one or more of the applications 212a-212n. It is noted that any of the applications 212a-212n can be within one cluster, multiple clusters, or not within any cluster. The cluster engine 240 can be activated by a user input and enable a user to select one or more applications from the application repository 210 to be included in the cluster. In certain embodiments, a cluster of applications can be similar to a folder on a GUI that includes files and applications. A user can select (or drag and drop) particular applications into a cluster. In certain embodiments, the cluster engine 240 allows a user to tag particular applications within the application repository 210 with labels, wherein each label indicates a particular cluster the application is included within. In certain embodiments, the cluster engine 240 creates multiple clusters by using different homepages. For example, each homepage on a GUI that displays one or more applications can act as a cluster of applications. Thereby, each homepage can include different settings for information (including notifications and updates), and features (including permissions) that each application within the particular homepage can access. The homepage can be the entirety of the user interface and display a first subset of applications. Thereafter when a particular input is received, a new user interface is displayed that includes another subset of applications.

In certain embodiments, the cluster engine 240 generates a temporary cluster of applications. For example, a user can select one or more applications from the application repository 210 and temporarily create a cluster of the selected applications. The temporary cluster can last for a specific period of time, such as minutes, hours, days, or the like. The temporary cluster can last until the user performs a particular action, such as moving the device to a new location, restarting the device, creating another temporary cluster, among others.

The cluster engine 240 can automatically, that is, without user intervention, create a cluster of applications. That is, the cluster engine 240 can generate a cluster without the user manually selecting particular applications from the application repository 210 to include in cluster.

For example, the cluster engine 240 can analyze metadata associated with the applications 212a-212n within the information repository. The metadata can indicate the type of the application, such as news, social media, messaging, internet browser, game, financial, shopping, blogs, and the like. The cluster engine, 240 then can create clusters for one or more of the various types of applications. In certain embodiments, the cluster engine 240 prompts a user to specify particular type(s) of applications to be included in a cluster, based on the metadata.

In another example, the cluster engine 240 can analyze how often the applications 212a-212n are accessed or used by a user of the electronic device 200. The cluster engine 240 identifies a frequency of use of the applications 212a-212n. Applications that are commonly used can be included in one cluster and applications that are not commonly used can be included in another cluster. In certain embodiments, a predetermined threshold can be assigned to each cluster, such that if any application is accessed over a first threshold amount of use/access (e.g., how many times, for how long, etc.), those applications are included in a first cluster, if any application is accessed over a second threshold, those applications are included in a second cluster, and so on for each additional threshold.

In yet another example, the cluster engine 240 can analyze the features that the applications 212a-212n access such as cellular data, location information, and the like. The cluster engine 240 can then create a cluster for a group of the applications that have access to similar features. It is noted that the applications 212a-212n can be included within multiple clusters.

In another example, the cluster engine 240 can analyze the titles or names associated with existing folders on the GUI that contain one or more of the applications 212a-212n. Based on the name of the folder, the cluster engine 240 determines whether to create a cluster that includes the applications within the folder. For instance, the cluster engine 240 can generate multiple clusters for the applications within each of one or more of the folders on the GUI. The cluster engine 240 can determine whether to generate a cluster based on the title of a particular folder or not to generate a cluster based on the title of a folder. For example, the cluster engine can identify certain names of a folder and create a cluster that includes the applications within the folder. Example folder names include (but are not limited to) "social media," "shopping," "news," "games," and the like. In certain embodiments, the cluster engine 240 can prompt the user as to whether a cluster should be created for particular folders based on the folder name.

The cluster engine 240 identifies the various features 220 each application within the cluster accesses on the electronic device 200. The cluster engine 240 can identify each of the features 220 that each of the applications 212a-212n can access. The application developer can program the applications to access different features of the electronic device. For example, the application 212a can be granted access to the features 222a and 222d (not shown); the application 212b can be granted access to the feature 222b; and the application 212c (not shown) can be granted access to the features 222a, 222b, and 222c (not shown). In another example, a navigational application needs to access the location of the electronic device 200 in order to provide navigational directions to the user. In another example, a user can interact with an application by moving the electronic device 200 in specific movements that are detected by motion sensors or via a touch input on the display screen. To use the motion sensors, the application needs access to the feature of motion sensors.

In certain embodiments, the cluster engine 240 displays each of the features 220 that are associated with any of the applications within the cluster. The particular features are displayed to a user to allow the user to enable or disable features associated with the applications within the cluster. That is, the cluster engine 240 can modify one or more features by enabling or disabling the feature(s) and apply modification to each application that accesses the particular feature(s). Referring to the example above, if applications 212a, 212b and 212c are included in a single cluster and the features 222a, 222b, 222c, and 222d are enabled, and if the feature 222a is subsequently disabled, then applications 212a and 212c are subsequently modified with respect to feature 222a, while the application 212b remains unchanged.

The cluster engine 240 displays the various features associated with each of the applications within the cluster. When the cluster engine 240 displays the various features associated with each of the applications within a cluster, the cluster engine 240 allows a user to enable or disable the features that are accessed by the applications within the cluster. For example, the cluster engine 240 can display all of the features to the user or a subset of the features to the user.

In certain embodiments, the cluster engine 240 displays all of the features that any of the programs (i.e., applications) within the cluster can access on the electronic device 200. The user can then change a permission to enable or disable access to any of the features. Displaying all of the features that any of the programs within the cluster can access on the electronic device 200 is comprehensive and provides all of the options available to the user.

In certain embodiments, the cluster engine 240 displays a subset of the features to the user. For example, certain features can be preset to display to a user if one of the applications within the cluster can access one of the features. For example, the cluster engine 240 can be preset to display only certain features such as features 222b and 222d if any application within the cluster accesses the features. If no application in the cluster accesses the features 222b and 222d, then the cluster engine 240 does not display any features, even if the other features within the cluster access other features, such as the feature 222a. If one application accesses only the feature 222d, then the cluster engine 240 displays only the feature 222d, even if the other features within the cluster access other features, such as the feature 222a. Similarly, if one application accesses the feature 222b and two other application accesses the feature 222d, then the cluster engine 240 displays the features 222b and 222d. The preset features can be preset by the user or a system designer of the user interface. For example, the preset features can include features that address privacy concerns, such as location data.

In another example, certain features that are displayed on the display 230 can be application dependent. For instance, the application developer of the application 212a can indicate that the features 222a and 222c are to be displayed, but the feature 222b does not need to be displayed to a user.

In another example, the cluster engine 240 analyzes past user behavior to determine certain features to display on the display 230. For instance, the cluster engine 240 determines particular features to display based on identifying various features that are commonly modified by either the user or the cluster engine 240 itself.

In another example, any combination of the above examples can be used when the cluster engine 240 displays a subset of the features on the display 230. For instance, the cluster engine 240 can provide a default set of commonly modified permissions for a particular cluster of applications. The cluster engine 240 then allows a user to modify the set by adding or removing permissions. The cluster engine 240 can also automatically add features to display to the user based on the past user behavior. It is noted that the displayed features can vary from one cluster of applications to another cluster of applications.

In another example, the cluster engine 240 enables a user to select features that are displayed on the display 230 when one of the applications within the cluster requires a permission to be granted in order to access to the selected feature. The cluster engine 240 can also display features that overlap a certain number of the applications within the cluster. For example, if the feature 222a can be accessed by five applications within the cluster while the feature 222b is accessed by only one application within the cluster, then the cluster program can display feature 222a to the user. In certain embodiments, a threshold is used to determine when to display a feature and when not to display a feature In certain embodiments, the cluster engine 240 displays a staged view of permissions. A staged level of permissions allows the cluster engine 240 to display a different quantity of permissions at various levels. For example, a first level can include a small number of features, a second level can include a larger number of features than those displayed in the first level, and a third level can display a larger number of permissions than those displayed in the second level. For instance, the first level can display three features, the second level can display eight features, and the third level displays all of the features that the applications within the cluster are able to access. The first level can include commonly accessed features, and enables a user to access the second level. The second level can display a larger set of permissions than the first level and provide access to the third level. In certain embodiments, more or few levels are possible.

In certain embodiments, the cluster engine 240 can identify features that are considered critical. Features are considered critical can include features that are related to privacy. For example, privacy can be associated with access to location data of the electronic device 200, a camera of the electronic device 200, a microphone of the electronic device 200, and the like. When a feature is identified as critical, the critical feature is displayed to a user to grant or deny permission to the feature when one of the applications within the cluster indicates that it can access that particular feature.

The cluster engine 240 enables or disables one or more features for the applications within the cluster. When a user manually changes a permission to access a feature, the change is applied to each application within the cluster that accesses the changed feature. The displayed features allow the user to enable or disable the feature, thereby granting or denying permission to the applications to access the particular feature. For example, if at least one of the applications within the cluster can be granted access to the internet, the cluster engine 240 can allow the user to determine internet connectivity of any applications within the cluster. For instance, the cluster engine 240 grants permission that any application within the cluster can have access to: (i) cellular data and WI-FI data, (ii) cellular data only, (iii) WI-FI data only, or (iv) deny any internet connectivity. The cluster engine 240 also prevents notifications associated with applications within a particular cluster from being displayed to a user permanently or a temporarily.

The cluster engine 240 enables or disables permissions associated with features based on different situations. For example, a feature can be temporarily enabled or disabled based on time, location of the electronic device 200, or an activity the user of the electronic device 200 is currently undertaking. In certain embodiments, a user can instruct the cluster engine 240 to enable or disable a feature. In certain embodiments, the cluster engine 240 enables or disables a feature automatically based on an attribute of the electronic device, where the attribute is based on time, location, or activity.

The attribute of the electronic device can be a timer or a scheduled event. The timer can grant applications within a cluster permission to access certain features for a period of time. Conversely, the timer can deny applications within a cluster access to certain features for a period of time. For instance, the cluster engine 240 can deny a permission of a certain feature to the applications within a particular cluster during certain hours of certain days. Within a cluster, the display 230 can display a toggle button that when activated prompts the user to select a period of time and certain features to enable or disable. If the user takes the electronics device 200 into a meeting, the user can set a timer for the duration of the meeting to deny permission to particular features associated with one or more clusters. In another example, the user can schedule a timer that when activated denies or grants permissions to the applications within a cluster. The scheduled timer can be displayed to the user in a settings view that allows a user to manually select certain features to schedule. The scheduled timer can be displayed to the user near, i.e., proximate to, an enable-disable toggle button. When the user creates a scheduled permission associated with a feature, the user is prompted to select a month, a week, a particular day or set of days, or a date, as well as a start and end time as to when to modify the permission.

In certain embodiments, a feature of the electronic device 200 is enabled or disabled based on the location of the electronic device 200. For example, the cluster engine 240 enables or disables one or more of the features 220 when the electronic device 200 is located at a predetermined location. For example, a permission can be withdrawn such as when the electronic device 200 is located at the place of work of the user. For instance, a user can deny a certain features (such as notifications) of certain applications (such as social media applications) while the electronic device 200 is located at a predetermined location, such as the user's place of employment. The cluster engine 240 can create an extra button near each displayed feature that allows a user to indicate whether the feature is enabled or disabled, or enabled or disabled based on a location of the electronic device 200. The cluster engine 240 can also create location tags that are applied to one or more of the features 220 within a cluster. When a user selects a location that modifies a permission to certain features, the location can be defined by a (i) singular address, (ii) a selected radius around a singular address, (iii) a manually drawn zone or area on a displayed map, and/or (iv) a particular location identifier, such as a name of a restaurant, venue, retail, district or section of a town, or the like. In certain embodiments, the cluster engine 240 can access a third party service to identify a particular location by name.

Another attribute can be based on an activity as detected by the cluster engine 240. Specific features of applications within a cluster can be granted or denied based on detected activities, such as when the user of the electronic device 200 is driving, sleeping, or working out, etc. In certain embodiments, the cluster engine 240 includes an activity recognition component that, based on motion or biometric sensors of the electronic device 200, detects certain activities. In certain embodiments, the cluster engine 240 uses an activity recognition system as provided by the operating system (such as the OS 161 of FIG. 1) of the electronic device 200. In certain embodiments, the cluster engine 240 uses an activity recognition system as provided by a third party via an application programming interface (API). The cluster engine 240 can prompt the user to enable or disable a feature based on an activity. For example, if the cluster engine 240 determines the user is in a car driving, then the cluster engine 240 can disable certain features such as data, and notifications, to prevent the user from getting distracted while driving. The cluster engine 240 detects that the electronic device is in a car and driving based on sensor data such as location data, time of day (such as the user drives to and from work during routine times of the day), and the like.

Cluster engine 240 gathers notifications and updates for the applications within each cluster. A user can provide an input to view the notifications within each cluster. Example inputs include (but are not limited to) a swipe, a tap, a press, a long tap, a hold, etc. The cluster engine 240 can display the notifications associated with each cluster when the cluster is opened or accessed by a user. In certain embodiments, when a cluster is accessed by a user, the cluster engine 240 can divide the visual representation of the cluster into multiple parts. A first part can include permission controls. A second part can include a representation of the applications within the cluster such as icons indicating the applications. A third part can include the notifications and updates. In certain embodiments, the cluster engine 240 can display the notifications and the applications within the cluster overlapping each other. For example, the notifications are displayed behind icons of the applications within the cluster. The user can select an icon to open an application, select a notification to bring the notification forward, drag the application in a predefined manner to bring the notification forward, and the like.

The cluster engine 240 can generate a widget based on the applications contained within a cluster. For example, the cluster engine 240 creates a feed of data from the applications within the cluster. If the cluster contains social medial type application, then the generated widget displays updates and the notifications associated with the various social media accounts. In another example, the cluster engine 240 can generate a widget that provides a list of the notifications and the applications contained within the cluster.

In certain embodiments, the cluster engine 240 displays the applications within the cluster to the user and allows a user to open an application, without opening the cluster itself. For example, the cluster engine 240 displays the applications in a circle around the cluster icon. For instance, in response to a user performing a long press and hold on the cluster icon, the cluster engine 240 displays the applications within the cluster. The user can then drag the input (e.g., the user's fingertip, a stylus, or a pointer, etc.) onto a particular application icon and release the input. In response to the user releasing the input, the application that the input was released over is activated. The quick view of applications displayed in a circle around the cluster is described in greater detail below with respect to FIG. 5E-G. In another example, the cluster engine 240 displays the applications of the cluster at different radii from the cluster icon. Displaying application icons at different radii can allow the cluster engine 240 to display more application icons in a given space. In another example, the cluster engine 240 can display the application icons in a row (or multiple rows) at different locations with respect to the cluster icon such as: above the cluster icon, below the cluster, or to the side of the cluster. The notifications for the applications within the cluster are displayed in proximity to the icons. For example, if the application icons are displayed above the cluster, the notifications can be displayed above the application icons. The quick view of applications displayed in a row above the cluster icon is described in greater detail below with respect to FIG. 5G.

Figure 3:
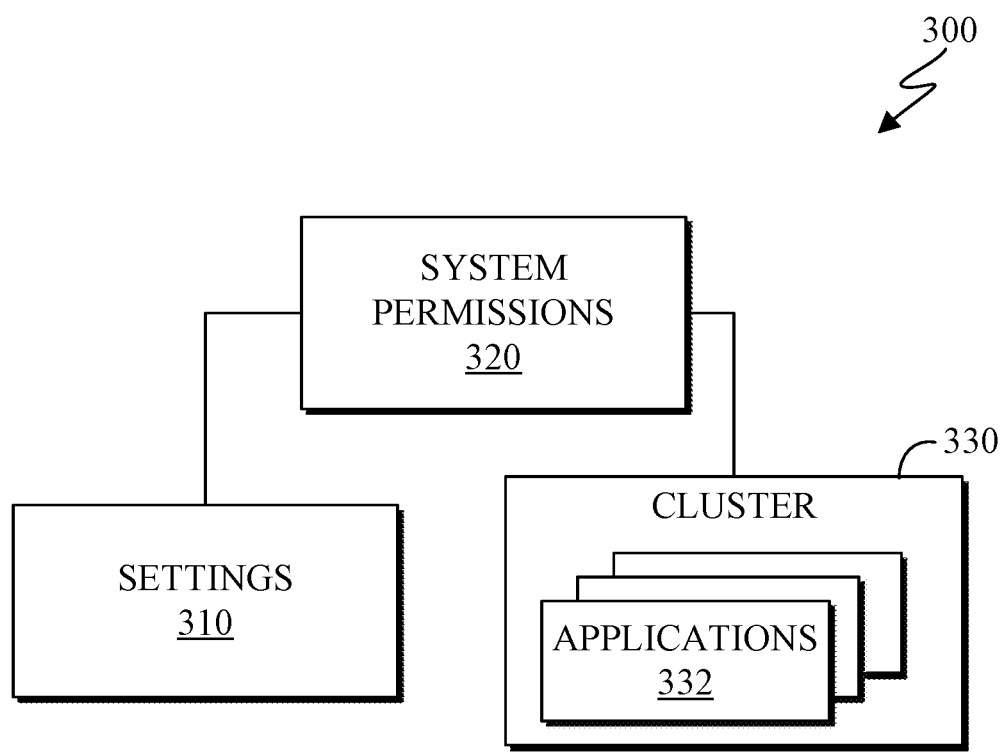
FIG. 3 illustrates an example diagram of system permissions applied to features of applications within a cluster in accordance with an embodiment of this disclosure.

FIG. 3 illustrates an example diagram 300 of system permissions applied to features of applications within a cluster in accordance with an embodiment of this disclosure. The diagram 300 is a system for enabling or disabling certain features that applications within a cluster can access in accordance with an embodiment of this disclosure. The embodiment of the diagram 300 shown in FIG. 3 is for illustration only. Other embodiments can be used without departing from the scope of the present disclosure. The diagram 300, as depicted in FIG. 3, occurs within the electronic device 200 of FIG. 2, and can include internal components similar to those of the electronic device 100 of FIG. 1. The diagram 300 includes settings 310, system permissions 320, and a cluster 330.

The cluster engine 240 analyzes the applications 332 within the cluster 330. The cluster engine 240 identifies the various features of the electronic device 200 that the applications 332 can access. The system permissions 320 can include a list the identified features used by the applications 332 within the cluster 330.

The settings 310 include the modifiable settings that the applications 332 are able to access from the electronic device 200. For example, one or more of the settings 310 can be modified automatically by the cluster engine 240 or manually by a user of the electronic device 200. When at least one of the settings 310 is modified, the system permissions 320 determines whether the modified setting affects one of the features that are accessed by one of the applications 332 within the cluster 330. If the system permissions 320 determines that one of the modified settings 310 affects at least one of the features that are accessed by any of the applications 332 within the cluster 330, the cluster 330 is notified of the altered permission by the system permissions 320. The altered permission is then applied to the applications 332 within the cluster 330. The altered permission can grant or deny the applications access to the feature. That is, when a permission is modified, the modified permission is transmitted from the system permissions 320 to the cluster 330. The cluster 330 then modifies each of the applications 332 (within the cluster 330) that access the particular feature.

Figure 4:
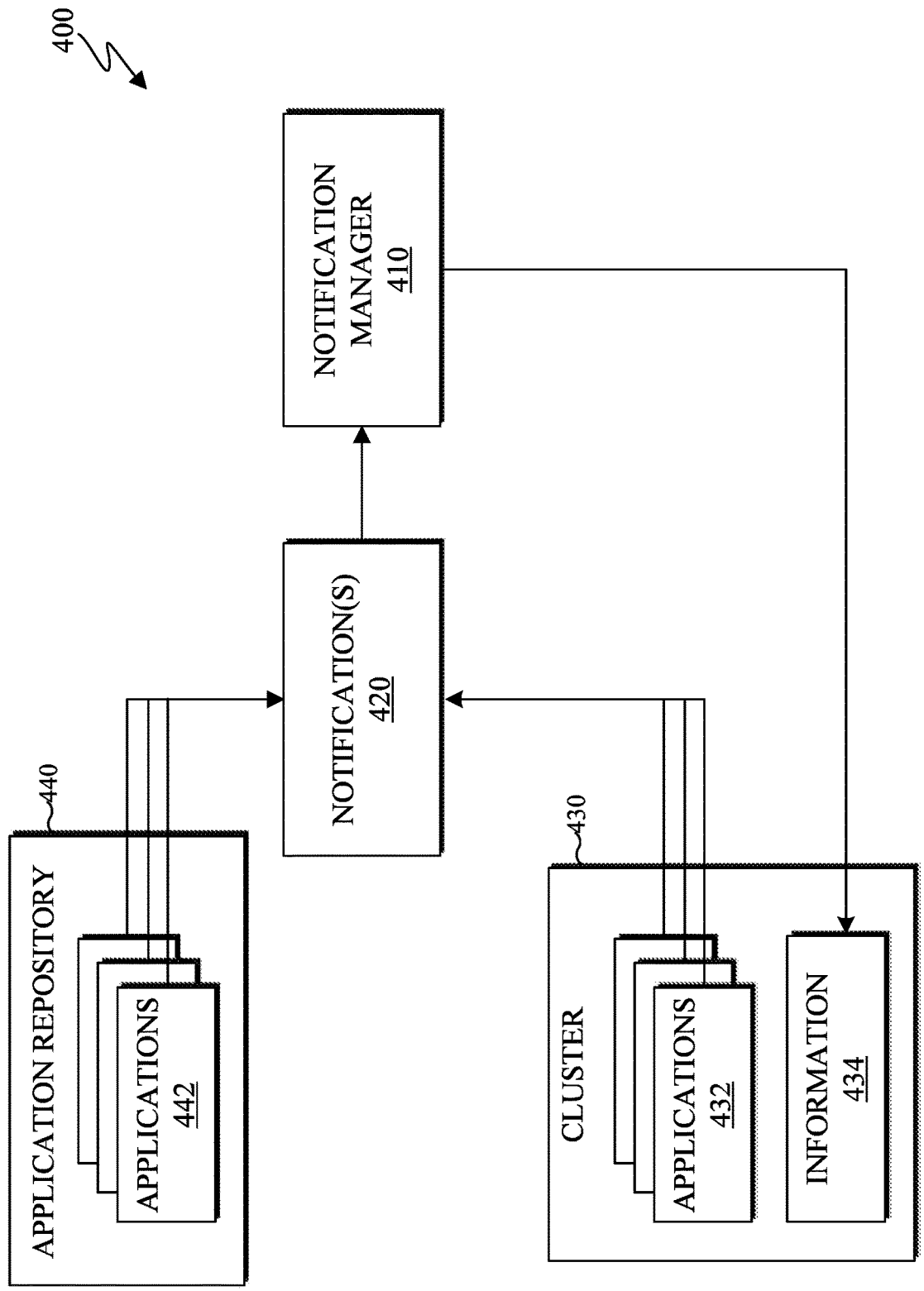
FIG. 4 illustrates an example diagram for receiving information associated with a cluster of applications in accordance with an embodiment of this disclosure.

FIG. 4 illustrates an example diagram 400 for receiving information associated with a cluster of applications in accordance with an embodiment of this disclosure. The diagram 400 illustrates an example of a notification system for grouping and gathering notifications of the applications within a cluster. The embodiment of the diagram 400 shown in FIG. 4 is for illustration only. Other embodiments can be used without departing from the scope of the present disclosure. The diagram 400 as depicted in FIG. 4 occurs within the electronic device 200 of FIG. 2, and can include internal components similar to those of the electronic device 100 of FIG. 1. The diagram 400 includes a notification manager 410, notification(s) 420, and a cluster 430 that includes applications 432 and information 434 associated with the applications 432, and an application repository 440 that includes applications 442.

The notification manager 410 manages received notification(s) 420, such as from the applications of the electronic device, such as the electronic device 200 of FIG. 2. In certain embodiments, the notification manager 410 can be similar to the cluster engine 240 of FIG. 2. The notification manager 410 determines where and how to display a received notification(s) 420 on the display of the electronic device. The notification manager 410 can receive the notification(s) 420 that are associated with one of the applications of the electronic device such as the applications 432 and the applications 442. Each of the notification(s) 420 can be information associated with an application, such as an event that occurred in the background, as well as indication that an update is available for the application. The application repository 440 includes applications 442. In certain embodiments, the application repository 440 can be similar to the applications repository 212 of FIG. 2. The applications 432 and 442 are similar to the applications 212a-212n of FIG. 2. The applications 442 represent all the applications of the electronic device. The applications 432 represent a subset or a portion of the applications 442 that are included within the cluster 430. All of the applications 432 (that are also included in the cluster 430), are part of the applications 442, as the applications 432 are a portion of the applications 442. In contrast, not all of the applications 442 are included in the applications 432, only a portion of the applications 442 are included in the cluster 430, and notification(s) 420 represent notifications that are received by the applications 442 and the applications 432.

The notification(s) 420 are notification(s) that are received by any of the applications (including both the applications 442 and the applications 432) of the electronic device. It is noted that if a notification from the notification(s) 420 is received for the one of the applications 432, then the same notification is received for the same application of the applications 442. A notification of the notification(s) 420 can be received for one of the applications 442, and that application is not within the cluster 430. When any application (such as applications 432 and 442) receives a notification, such as the notification(s) 420, the notification is passed to the notification manager 410. That is, when an application receives a notification, the notification(s) 420 is sent to the notification manager.

The notification manager 410 generates a notification to notify the user that a particular event occurred in the background of the electronic device. The notification manager 410 generates an icon that can be placed in a status bar of the electronic device. The notification manager 410 alerts the user of a received notification by (i) turning on or flashing various lights associated with the electronic device, (ii) flashing the backlight of the display 230 of FIG. 2 or the display 155 of FIG. 1, (iii) playing a sound such as through the speakers 130 of FIG. 1, (iv) vibrating the electronic device, or any combination thereof. In certain embodiments, the notification manager 410 is associated with the OS of the electronic device, similar to the OS 161 of FIG. 1.

If the notification manager 410 receives a notification from the notification(s) 420 from one of the applications 432 within the cluster 430, the notification is displayed inside the cluster 430 via information 434. If the notification manager 410 receives a notification from the notification(s) 420 that is not from any of the applications 432 within the cluster 430, the notifications are displayed at a location other than the information 434 within the cluster 430. For example, the notification from the notification(s) 420 can be displayed to the user on the status bar of the electronic device. The notification manager 410 determines where to display a received notification from the notification(s) 420.

Furthermore, in certain embodiments, multiple notifications can be received from different applications in one or more clusters. In one example, at least two applications can be included in the same cluster and a respective notification can be received for each of the at least two applications in the cluster. In this example, the notification manager 410 determines that the two respective notifications are associated with (and can be displayed in connection with) the same one cluster, because the at least two applications are in the same cluster. Thus, the notification manager can display the two respective notifications in connection with (e.g., within, adjacent to, near, or in close proximity to, etc.) that same cluster. In another example, a first application and a second application can be included in two different clusters. A first notification can be received for the first application in a first cluster while a second notification can be received for the second application in a second cluster. In this example, the notification manager 410 can determine that the first notification is associated with (and can be displayed in connection with) the first cluster, because the first application is in the first cluster. In this example, the notification manager 410 can also determine that the second notification is associated with (and can be displayed in connection with) the second cluster, because the second application is in the second cluster.

FIGS. 5A-5G illustrates an example electronic device 500 in accordance with an embodiment of this disclosure. The electronic device 500 can be similar to the electronic device 200 of FIG. 2 and can include internal components similar to the electronic device 100 of FIG. 1. The embodiment of the electronic device 500 shown in FIGS. 5A-5G are for illustration only. Other embodiments can be used without departing from the scope of the present disclosure.

The electronic device 500 includes a display 520, which can be similar to the display 230 of FIG. 2 and the display 155 of FIG. 1. The display 520 displays a plurality of applications represented as icons, such as app. 522, app. 524, app. 526, and app. 528. The electronic device 500 includes a cluster 530 of applications. The cluster 530 can be similar to a folder that includes applications. In certain embodiments, some or all of the applications such as app. 522, app. 524, app. 526, and app. 528 are included in the cluster 530. In certain embodiments, none of the applications such as app. 522, app. 524, app. 526, and app. 528 are included in the cluster 530.

Figure 5A:
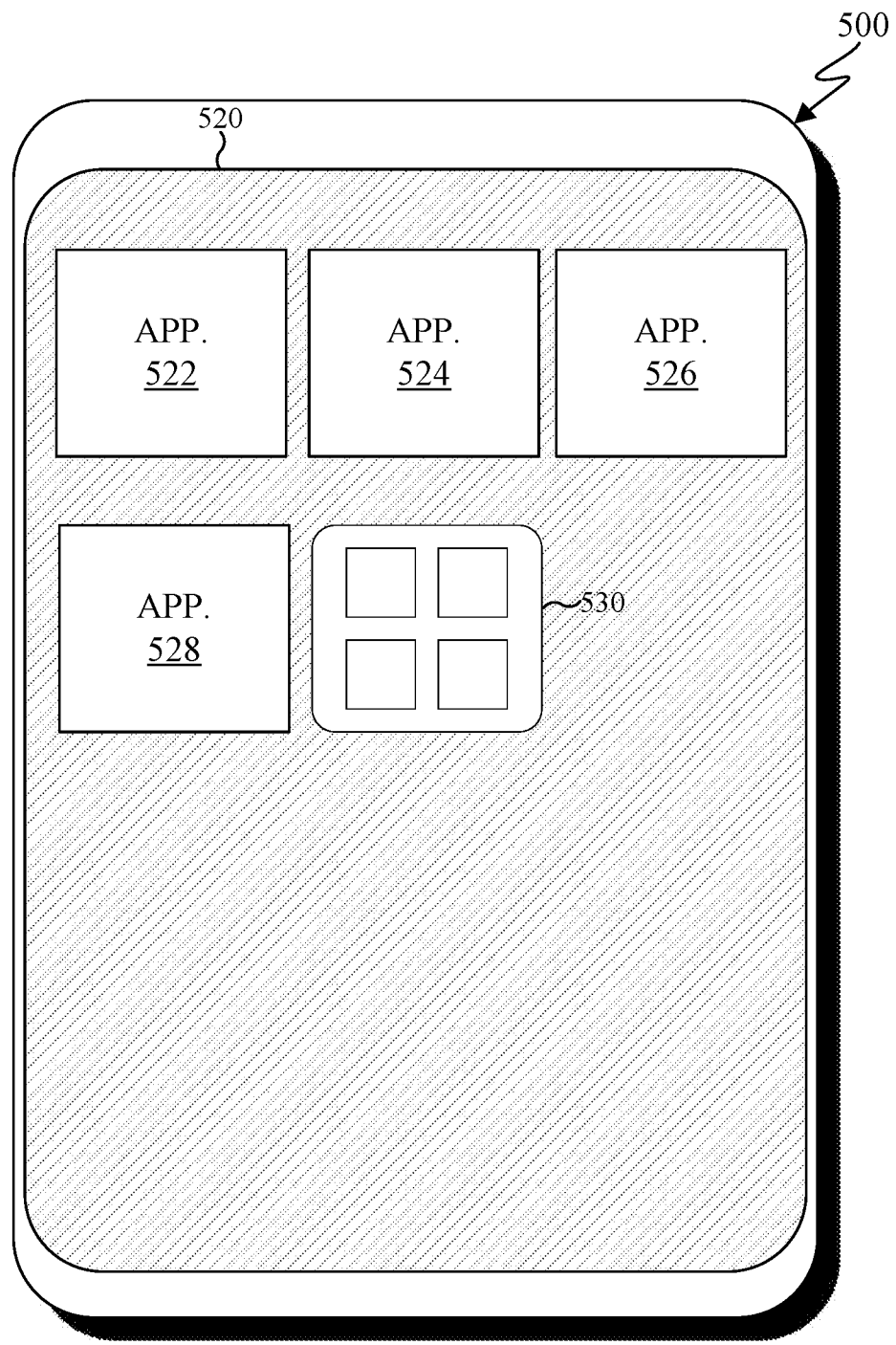
FIG. 5A illustrates an example electronic device displaying applications and a cluster of applications in accordance with an embodiment of this disclosure.

FIG. 5A illustrates an example electronic device displaying applications and a cluster of applications in accordance with an embodiment of this disclosure. The display 520 depicts app. 522, app. 524, app. 526, and app. 528 (collectively apps. 522-528) and the cluster 530. The cluster 530 is a collection of a subset of the applications within the electronic device 500. The subset of applications includes one or more applications of the electronic device 500. The cluster engine 240 modifies permissions associated with the various applications within the cluster 530 thereby enabling or disabling the applications' access to features of the electronic device 500.

Figure 5B:
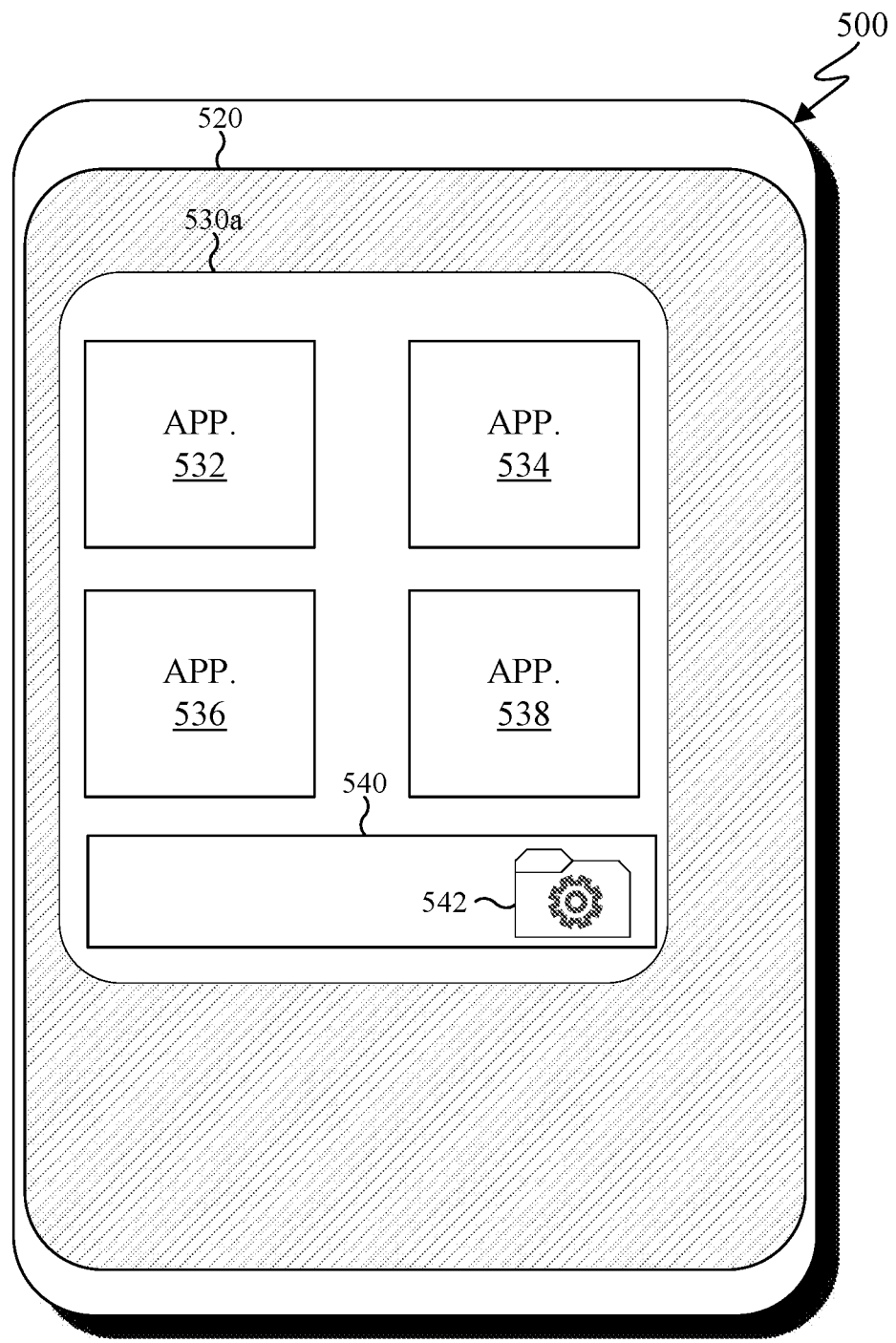
FIG. 5B illustrates an example electronic device displaying a cluster of applications in accordance with an embodiment of this disclosure.

FIG. 5B illustrates the example electronic device 500 displaying a cluster 530a of applications in accordance with an embodiment of this disclosure. When the electronic device 500 receives an input to open cluster 530, the cluster is opened and displayed as the cluster 530a. The cluster 530a includes app. 532, app. 534, app. 536, and app. 538 (collectively apps. 532-538). Apps. 532-538 can include one or more of the apps. 522-528 of FIG. 5A. Alternatively, the Apps. 532-538 include none of the apps. 522-528 of FIG. 5A. A control section 540 is displayed within the cluster 530a. The control section 540 can include a settings menu 542. The control section 540 can also include any other quick access functions or settings such as a toggle switch to enable or disable certain features accessible by the apps. 532-538, such as data, location services, and the like.

Figure 5C:
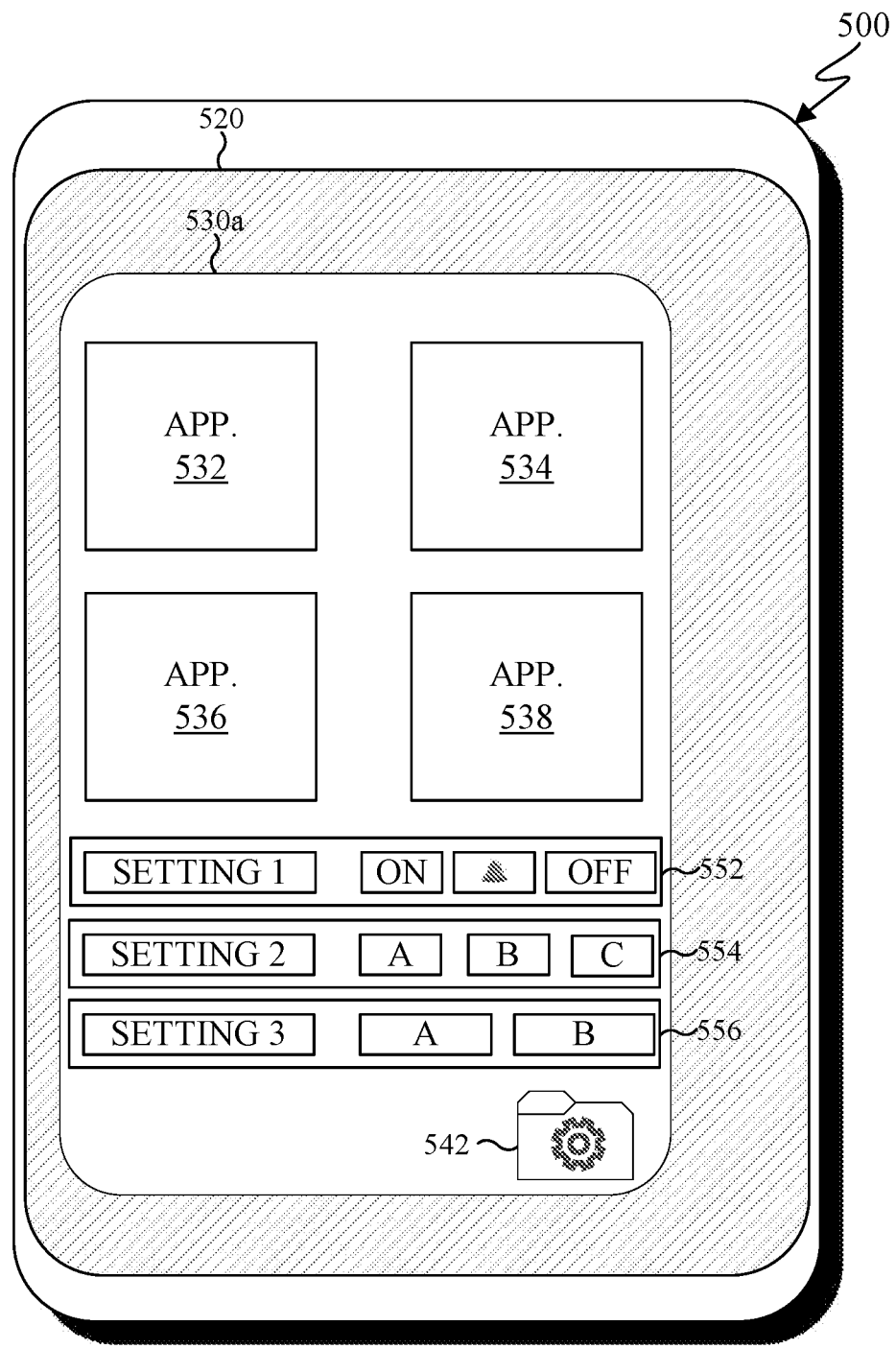
FIG. 5C illustrates an example electronic device displaying a cluster of applications and a settings menu that regulate permissions to the applications within the cluster in accordance with an embodiment of this disclosure.

FIG. 5C illustrates the example electronic device 500 displaying the cluster 530a of applications and the settings menu 542 that regulates the permissions to the applications within the cluster, in accordance with an embodiment of this disclosure. When the settings menu 542 of FIG. 5B is activated by a user input, various settings such as settings 552, 554, and 556 can be displayed, as illustrated in FIG. 5C. In certain embodiments, more or less settings are displayed. Setting 552 can be a notification setting that allows a user to permanently enable or disable notifications within the cluster 530 (as indicated by the 'ON,' toggle button). For example, the setting 552 can permanently disable notifications within the cluster 530 (as indicated by the 'OFF,' toggle button), or set a timer to enable or disable the notifications for a period of time. The setting 554 can be a connectivity setting that allows a user to enable or disable the apps. 532-538 access to the internet or a remote server. For example, the setting 554 can include toggle buttons that allow a user to select a default setting, a WI-FI and cellular data setting, a cellular data only setting, a WI-FI only setting, or disable all communications to the internet or a remote server over any medium. The settings 556 can allow a user to quickly enable or disable the location feature allowing the apps. 532-538 to receive location information.

In another example, a feature can be associated with a setting that is applicable to a cluster of applications. In this example, the setting (e.g., when enabled) can cause the applications to be temporarily removed from the device to temporarily free up storage space on the device. Continuing with this example, in some cases, only the application data (e.g., installation data/files) for these applications are removed but the user data (e.g., user profiles for these applications, user state/progress data for these applications, personalized user data for these applications) for these applications can be retained at the device. As such, during an update process such as a device OS update, the setting (if enabled) can cause the device to remove the applications temporarily, while retaining user data for the applications, in order to free up device resources to perform the update process. When the update process is complete, the device can reinstall the applications, and the retained user data can still be used with the reinstalled applications.

Other settings can include a privacy setting that prompts a user to secure the applications within the cluster 530 with a password or personal identification number (PIN). Securing the applications within a cluster prevents access to the applications unless the request password or PIN is entered. Additional settings can be displayed for a user to access and modify the permissions that the applications within each cluster can access. In certain embodiments, all of the features that the apps. 532-538 access can be displayed. In certain embodiments, an application developer of an application, such as application 432, can indicate that the certain features should be displayed within the settings menu 542. In certain embodiments, the cluster engine 240 of FIG. 2, analyzes past user behavior, such as common features that the user enables or disables on a per-cluster basis or a system wide basis to display within each cluster. For example, the cluster engine 240 determines particular features to display based on identifying various features that are commonly modified by either the user or the cluster engine 240 itself.

Figure 5D:
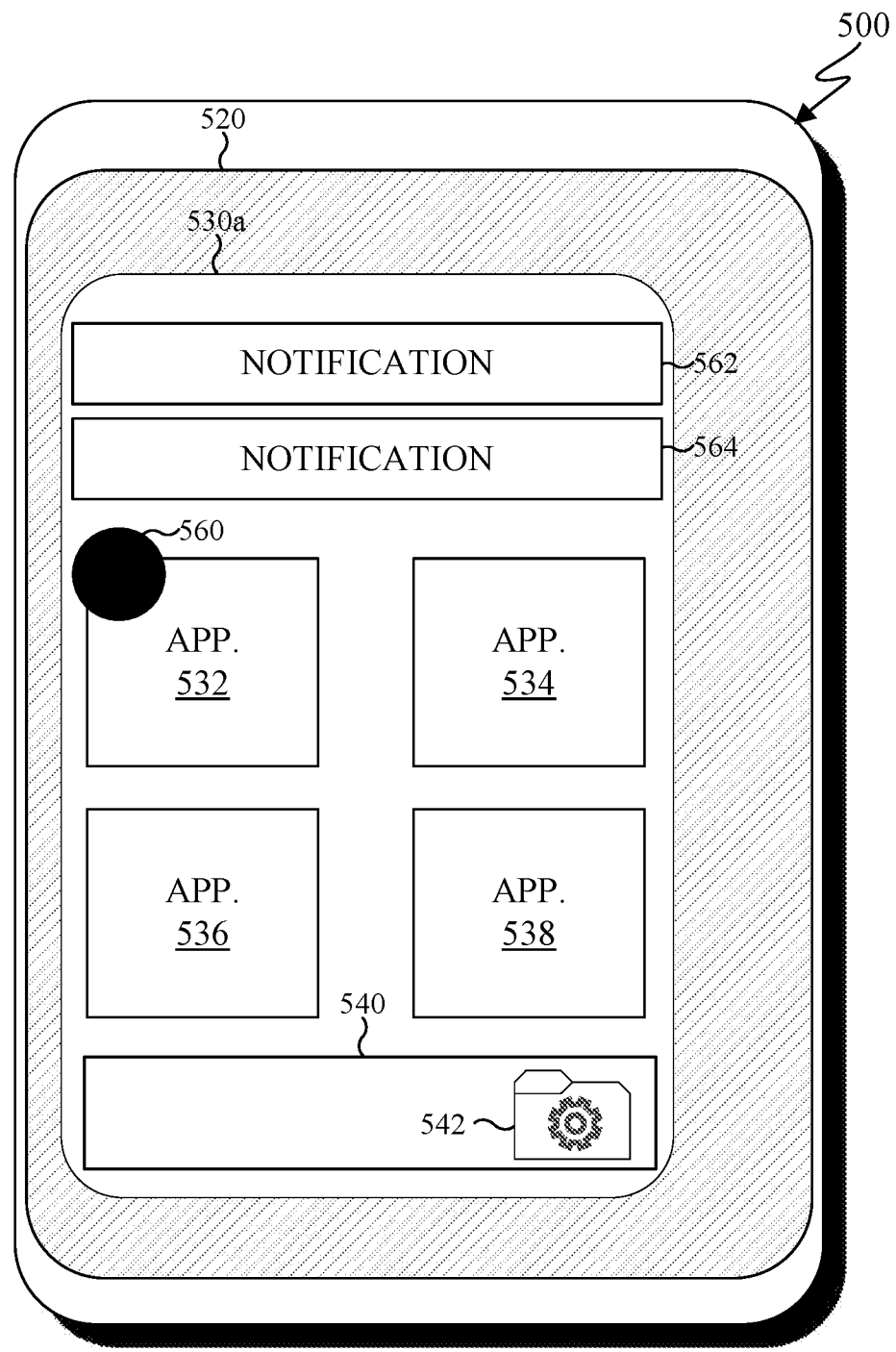
FIG. 5D illustrates an example electronic device displaying a cluster of applications with information associated with an application within the cluster in accordance with an embodiment of this disclosure.

FIG. 5D illustrates the example electronic device 500 displaying a cluster of applications with information associated with an application within the cluster in accordance with an embodiment of this disclosure. When the electronic device 500 receives an input to open cluster 530, the cluster is opened and displayed as the cluster 530a on display 520. The app. 532 includes a notification indication 560. The notification indication 560 provides a displayed indication to a user that the application to which the notification indication 560 is affixed includes a notification, such as notification 562 and notification 564. Notifications 562 and 564 can include a push notification from a server serving the app. 532, a notification that an update is available for the app. 532, or any other type of notification received by the electronic device 500 and associated with the app. 532. In certain embodiments, multiple applications such as app. 532 and 536 can include the notification indication (similar to the notification indication 560) that indicates the existence of notifications, such as notifications 562 and 564, which are displayed to the user. It is noted that the notifications 562 and 564 are associated with any of the apps. 532-538 that are within the cluster 530. In certain embodiments, the notifications 562 and 564 are displayed on the display 520 only when the application associated with the notification is selected by a user. A notification indication (similar to the notification indication 560) indicates the existence of the notifications 562 and 564. Notifications associated with an application that is not within the cluster 530, such as app. 522 of FIG. 5A, is displayed elsewhere.

Figure 5E:
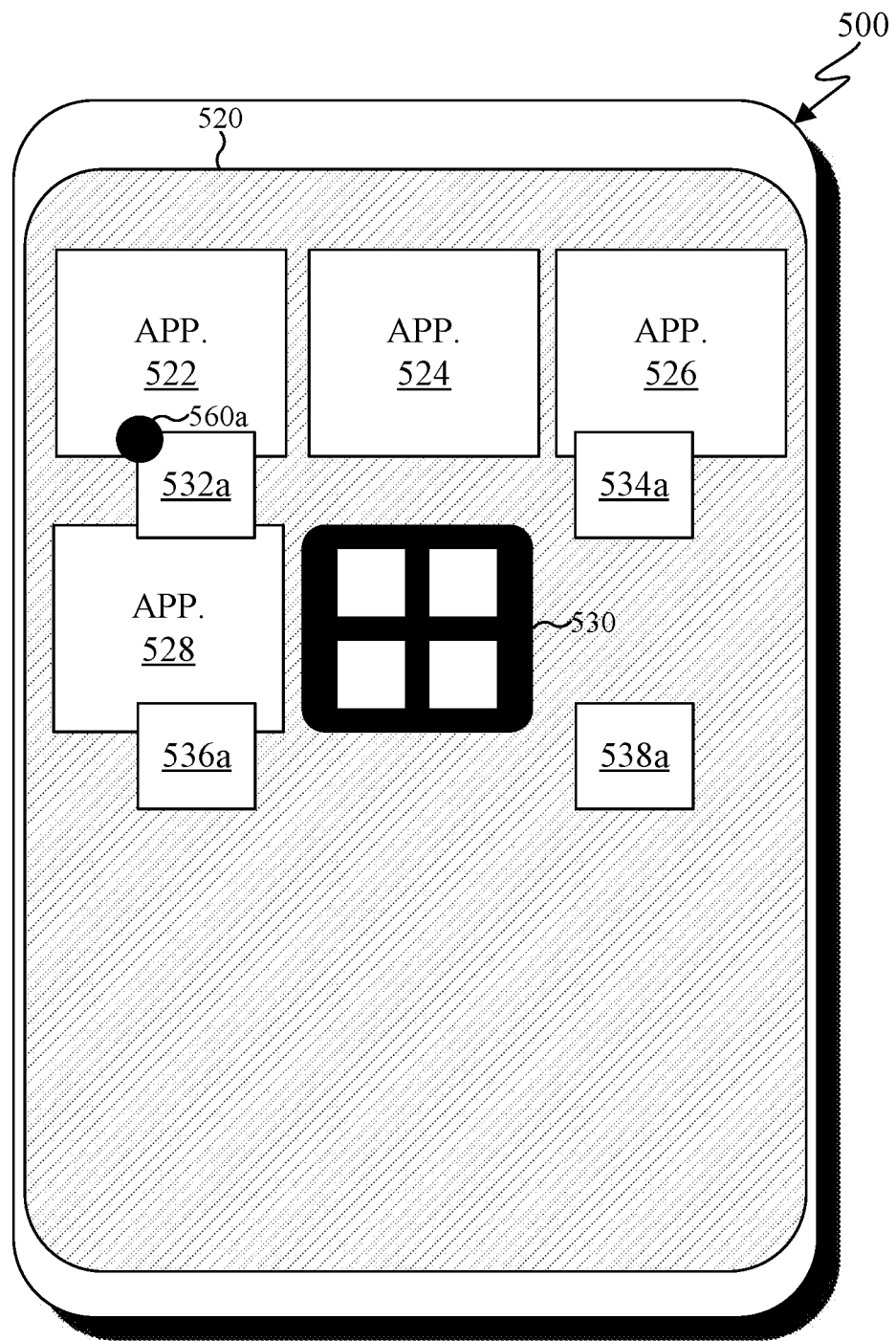
FIGS. 5E, 5F and 5G illustrate an example electronic device with a quick access view of applications within a cluster in accordance with an embodiment of this disclosure.
Figure 5F:
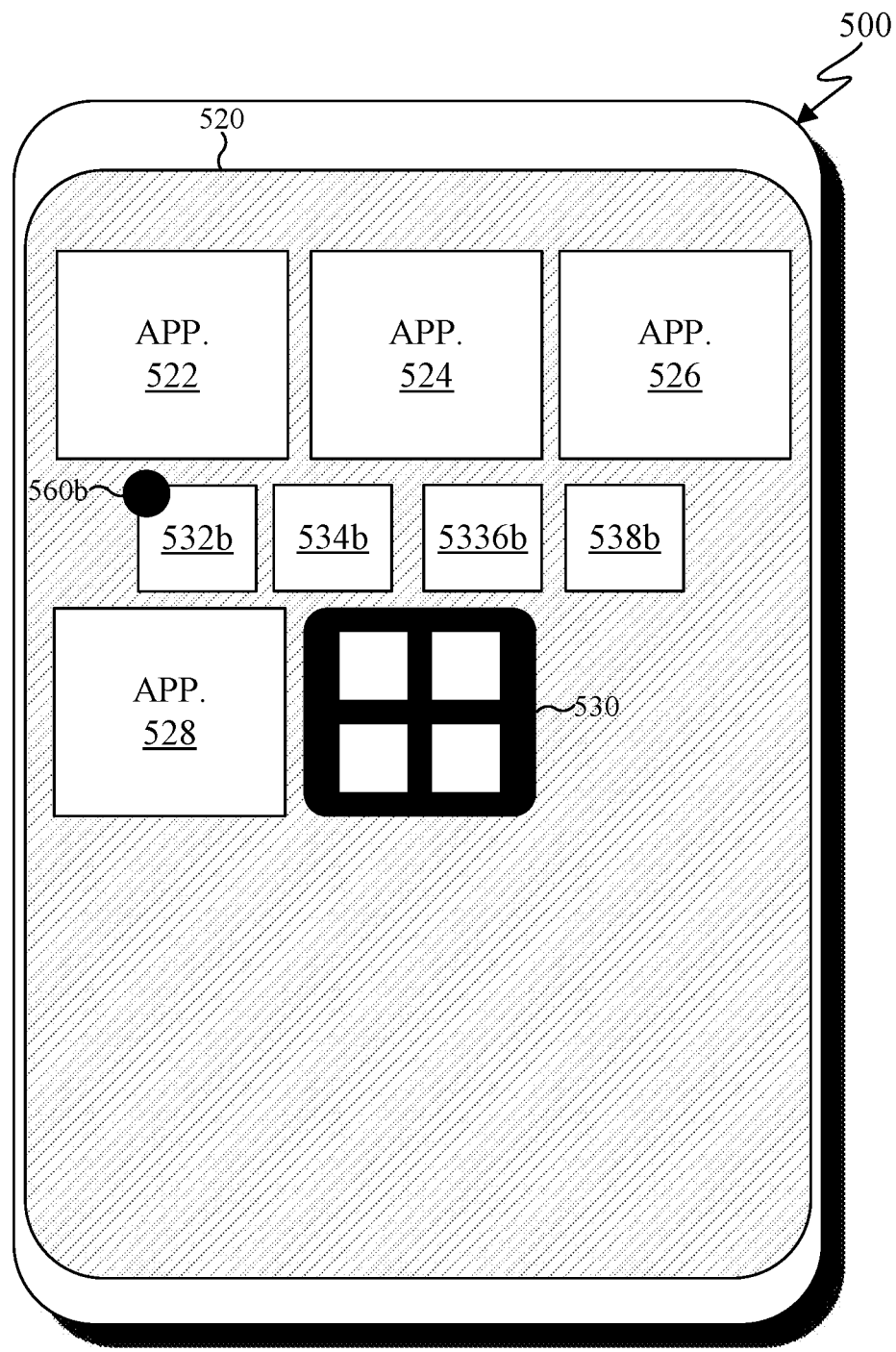
Figure 5G:
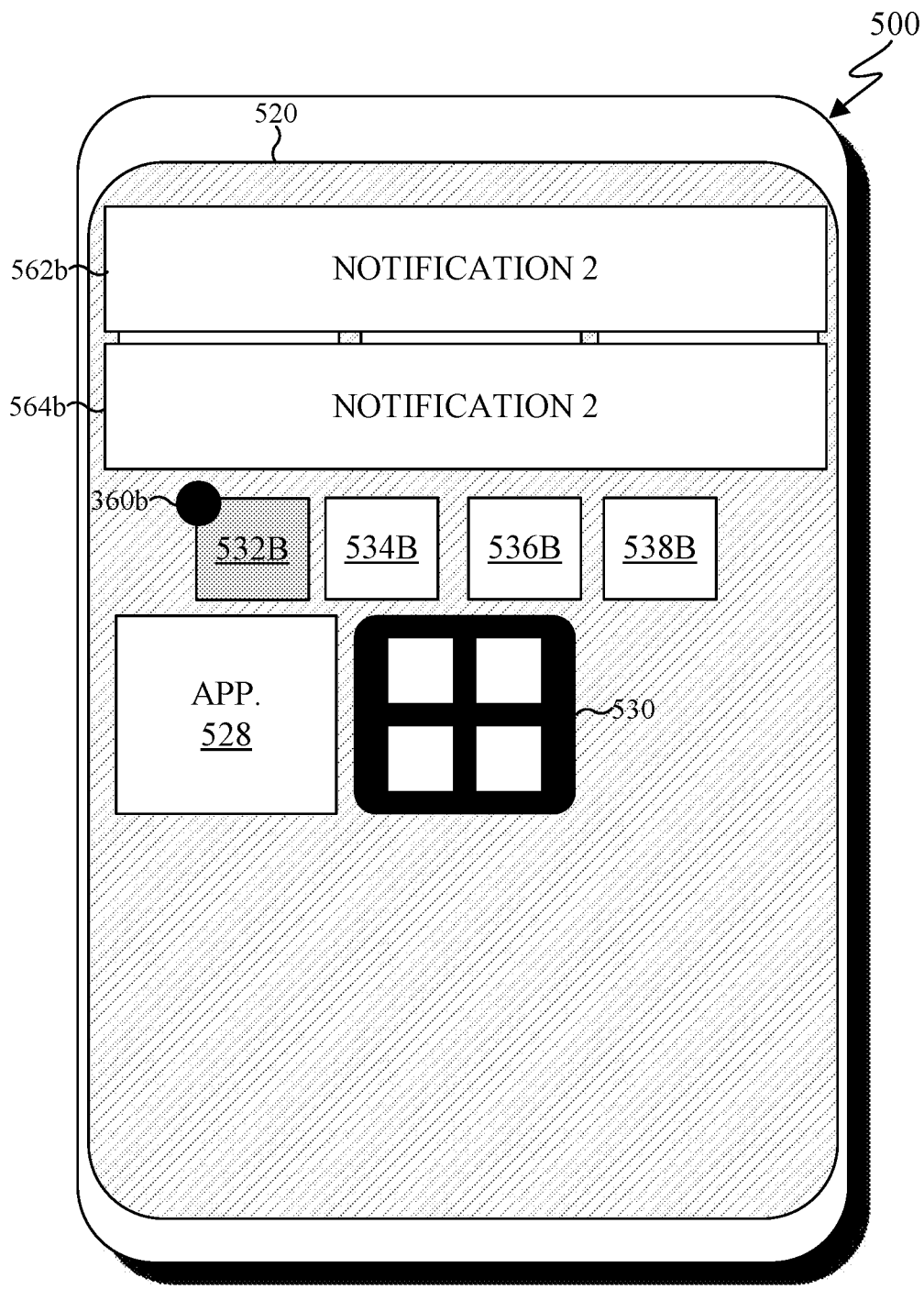

FIGS. 5E-G illustrates the example electronic device 500 with a quick access view of applications within a cluster in accordance with an embodiment of this disclosure. FIGS. 5E and 5G are similar to FIG. 5A, depicting the electronic device 500 displaying on the display 520 apps. 522-528 and the cluster 530. Specifically, FIGS. 5E-5G depicts the cluster 530 prior to the cluster being opened as depicted in FIGS. 5B, 5C, and 5D.

With respect to FIGS. 5E and 5F, when a user performs a predefined input, such as a long press and hold on the touch screen of the display 520, icons representing the applications within the cluster are displayed to the user. The example shown in FIG. 5E depicts the multiple icons representing applications such as apps 532a, 534a, 536a, and 538a in a circle with the same radius around the cluster 530. Apps. 532a, 534a, 536a, and 538a are the same apps as apps. 532, 534, 536, and 538 of FIGS. 5B-5D. The example shown in FIG. 5F depicts the multiple icons representing applications such as apps 532b, 532b, 536b, and 538b in a line above the cluster 530. Apps. 532b, 534b, 536b, and 538b are the same as apps. 532a, 534a, 536a, and 538a of FIG. 5E and are also the same apps as apps. 532, 534, 536, and 538 of FIGS. 5B-5D.

The app. 532a of FIG. 5E and the app. 532b of FIG. 5F include a notification indication 560a and 560b, respectively. The notification indications 560a and 560b are similar to the notification indication 560 of FIG. 5D. The notification indications 560a and 560b indicate to the user that one or more notifications are available for the user to view that are associated with the app. 532a or app. 532b respectively.

FIG. 5G illustrates the notifications 562b and 564b associated with app. 532B displayed on the display 520. For example, if a user presses and holds the cluster 530, the quick view of applications within the cluster 530 is displayed (similar to FIG. 5F). If the user then drags the input to app. 532b, the notifications, such as notifications 562b and 564b are displayed. If the user releases the input over any of the applications, such as app. 532b, then the application is opened allowing the user access to the applications without having to open the cluster 530, as described above with respect to FIG. 5B. The notifications 562b and 564b are similar to the notifications 562 and 564 of FIG. 5D.

Figure 6:
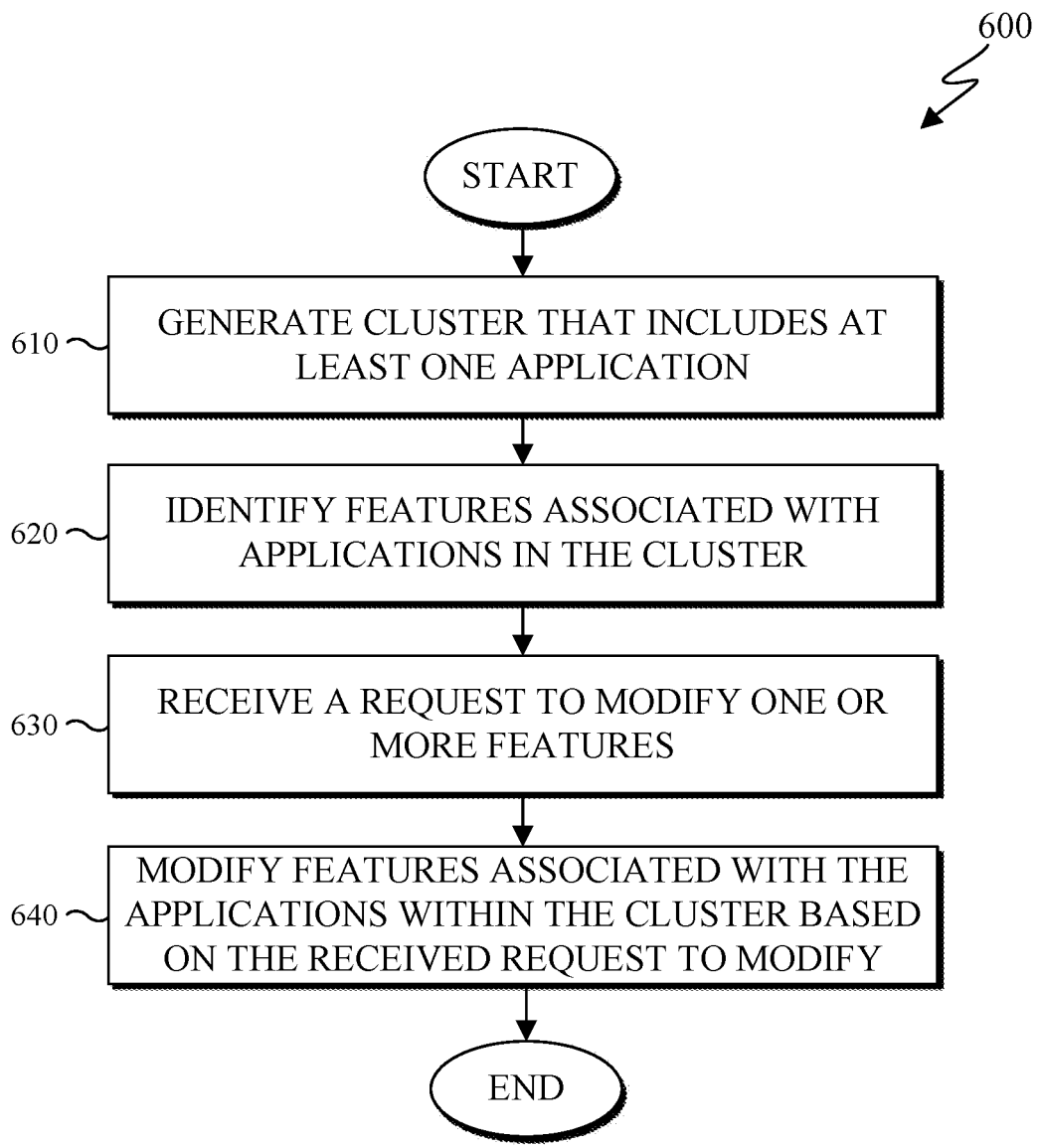
FIG. 6 illustrates a method for operating an electronic device in accordance with an embodiment of this disclosure.

FIG. 6 illustrates a method for operating an electronic device in accordance with an embodiment of this disclosure. FIG. 6 does not limit the scope of this disclosure to any particular embodiments. While process 600 depicts a series of sequential steps, unless explicitly stated, no inference should be drawn from that sequence regarding specific order of performance. For example, performance of steps as depicted in process 600 can occur serially, concurrently, or in an overlapping manner. The performance of the steps depicted in process 600 can also occur with or without intervening or intermediate steps. For ease of explanation, the method of operating the electronic device is performed by the cluster engine 240 of FIG. 2 and described with respect to the electronic device 100 of FIG. 1, the electronic device 200 of FIG. 2, the example diagram 300 of FIG. 3, the example diagram 400 of FIG. 4, and/or the electronic device 500 of FIGS. 5A-5G. However, the process 600 can be used with any other suitable system.

In block 610, the cluster engine 240 generates a cluster that includes at least one application. In certain embodiments, the cluster engine 240 receives application data about applications stored on the electronic device. The cluster engine 240 can create the cluster to include selected applications. The selected applications can be selected by the user of the cluster engine 240. The cluster engine 240 can select or suggest applications to be included in a cluster. In certain embodiments, the cluster engine 240 can create the cluster to include applications of similar types, when the received application data includes an application type associated with each of the applications. Example application types include news, social media, email, and messaging. In certain embodiments, the cluster engine 240 can create the cluster to include applications that are accessed over a predetermined quantity of time, when the received application data includes a quantity of times that each of the applications are accessed. For example, if a user accesses a certain applications over ten times in a single day, those applications can be included in a single cluster. In another example, a cluster can be created for applications accessed over fifteen times in a day, another cluster created for applications opened between ten and fourteen times in a day, and another cluster created for applications opened between five and ten times and a day. The threshold number or range of times an application is opened to create a cluster can be predetermined.

In block 620, the cluster engine 240 identifies features associated with applications in the cluster. The cluster engine 240 identifies a set of features (i.e., a set of one or more features) associated with each of the at least one application included within the cluster. In certain embodiments, the cluster engine 240 determines that one of the identified set of features is a critical feature. The cluster engine 240 then selects a subset of the identified set of features to include the critical feature. In response to selecting the subset of features, the selected subset of features are then displayed on a display of the electronic device. In certain embodiments, the cluster engine 240 can also analyze previous requests to modify one or more of the identified set of features. The cluster engine 240 then selects a subset of the identified set of features that includes the one or more analyzed features that correspond to the previous requests to modify. In response to selecting the subset of features, the selected subset of features are then displayed on a display of the electronic device. In certain embodiments, the features that the cluster engine 240 identifies can include at least one of, a permission to access a component of the electronic device, a setting of the electronic device, and information. The information can include a notification that is received and is associated with an application within the cluster.

In block 630, the cluster engine 240 receives a request to modify one or more of the set of features. In certain embodiments, the request to modify is a user input directing the cluster engine 240 to alter a permission to a feature. In certain embodiments, the cluster engine 240 receives data about a state of the electronic device from one or more sensors. In response to receiving state data the cluster engine 240 determines whether to modify the one or more features temporarily based on the received state data. In certain embodiments, the state data includes location data from a location sensor of the electronic device. In certain embodiments, the state data includes timer data from a timer of the electronic device. In certain embodiments, the state data includes a detected activity associated with the electronic device. The detected activity can be when the user is listening to music, working out, driving, at work, eating a meal at a restaurant, or any other activity or event that the electronic device can detect.

In block 640, the cluster engine 240 modifies the one or more features associated with each of the at least one application within the generated cluster, based on the received request to modify. In certain embodiments, the cluster engine 240 permanently modifies one or more features. The features are modified in a permanent manner unless a request to modify the same or similar features is received in the future. In certain embodiments, the cluster engine 240 temporarily modifies one of more features. The feature can be modified temporarily until an event occurs, whereby the cluster engine returns the feature to the previous state.

The feature can be modified temporarily until a timer expires, whereby the cluster engine returns the feature to the previous state. For example, the feature is disabled upon the expiration of the timer, and thereafter the feature is enabled. The cluster engine 240 can determine whether the timer data indicates that one or more features associated with each application within a cluster are to be modified. In response to determining that the timer data indicates that the one or more features are to be modified, the cluster engine 240 modifies the one or more features associated with each of the at least one application within the cluster until the timer data indicates that a specified time threshold is reached.

The feature can be modified temporarily based on the location of the electronic device. For example, when the electronic device is within a certain area, the cluster engine 240 disables or enables a particular feature of the electronic device. The cluster engine 240 can match a predetermined location to a particular location indicated via the location data. The cluster engine 240 then modifies the one or more features associated with each of the at least one application within the cluster while the particular location indicated via location data matches the predetermined location.

The feature can be modified temporarily based on an activity. For example, if the activity is driving in the car, the cluster engine 240 enables or disables the feature when driving is detected.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating an electronic device, the method comprises:

displaying, on a display of the electronic device, a folder that includes at least one icon representing at least one application, respectively;
identifying a set of features of the electronic device that can be accessed by any of the at least one application represented within the folder, wherein each feature of the set of features is associated with a corresponding permission that enables or disables each of the at least one application represented within the folder from accessing the feature;
receiving a request to modify a first permission associated with a first feature of the identified set of features that is accessed by a first subset of the at least one application that is represented within the folder; and
modifying the first permission associated with the first feature for the first subset of the at least one application that is represented within the folder based on the received request to modify.

2. The method of claim 1, further comprises:
receiving data about a state of the electronic device from one or more sensors of the electronic device;
determining whether to modify a second permission associated with a second feature temporarily based on the received state data; and
in response to determining to modify, modifying the second permission associated with the second feature for a second subset of the at least one application that is represented within the folder temporarily.

3. The method of claim 2, wherein:
the received state data includes location data from a location sensor of the electronic device;
determining whether to modify the second permission temporarily based on the received state data comprises, matching a predetermined location to a particular location indicated by the location data; and
modifying the second permission for the second subset of the at least one application that is represented within the folder temporarily comprises, modifying the second permission associated with the second feature for the second subset of the at least one application that is represented within the folder while the particular location indicated by the location data matches the predetermined location.

4. The method of claim 2, wherein:
the received state data includes timer data from a timer of the electronic device;
determining whether to modify the second permission temporarily based on the received state data comprises, determining whether the timer data indicates that the second permission associated with the second feature for the second subset of the at least one application that is represented within the folder are to be modified; and
modifying the second permission for the second subset of the at least one application that is represented within the folder temporarily comprises, modifying the second permission associated with the second feature for the second subset of the at least one application that is represented within the folder until the timer data indicates that a specified time threshold is reached, in response to determining that the timer data indicates that the second permission is to be modified.

5. The method of claim 1, further comprises:
determining that one of the identified set of features is a critical feature;
analyzing previous requests to modify one or more of the identified set of features;
selecting a portion of the identified set of features to include the critical feature and one or more analyzed features that correspond to the previous requests to modify; and
displaying, on the display of the electronic device, the portion of the identified set of features.

6. The method of claim 1, further comprises:
receiving application data about applications stored on the electronic device; and
generating a cluster of the at least one application, wherein generating the cluster comprises:
when the received application data includes at least one selected application, creating the cluster to include each of the at least one selected application,
when the received application data includes an application type associated with each of the applications, creating a first set of clusters that include each of the at least one application of a similar type, and
when the received application data includes a quantity of times that each of the applications are accessed within a predetermined period, creating a second cluster that includes each of the at least one application that is accessed over a predetermined quantity of times.

7. The method of claim 1, wherein at least one feature of the identified set of features associated with at least one of:
a setting of the electronic device; or
information that is received and is associated with one of the at least one application.

8. An electronic device comprising:
a display;
a memory configured to store a plurality of applications; and
at least one processor, wherein the at least one processor is configured to:
display a folder that includes at least one icon representing at least one application of the plurality of applications, respectively,
identify a set of features of the electronic device that can be accessed by any of the at least one application represented within the folder, wherein each feature of the set of features is associated with a corresponding permission that enables or disables each of the at least one application represented within the folder from accessing the feature,
receive a request to modify a first permission associated with a first feature of the identified set of features that is accessed by a first subset of the at least one application that is represented within the folder, and
modify the first permission associated with the first feature for the first subset of the at least one application that is represented within the folder based on the received request to modify.

9. The electronic device of claim 8, further comprises:
one or more sensors; and
wherein the at least one processor is further configured to:
receive data about a state of the electronic device from the one or more sensors of the electronic device,
determine whether to modify a second permission associated with a second feature temporarily based on the received state data, and
in response to determining to modify, modify the second permission associated with the second feature for a second subset of the at least one application that is represented within the folder temporarily.

10. The electronic device of claim 9, wherein:
the received state data includes location data from a location sensor of the electronic device;
to determine whether to modify the second permission temporarily based on the received state data, the at least one processor is further configured to match a predetermined location to a particular location indicated by the location data; and
to modify the second permission for the second subset the at least one application that is represented within the folder temporarily, the at least one processor is further configured to modify the second permission associated with the second feature for the second subset of the at least one application that is represented within the folder while the particular location indicated by the location data matches the predetermined location.

11. The electronic device of claim 9, wherein:
the received state data includes timer data from a timer of the electronic device;
to determine whether to modify the second permission temporarily based on the received state data, the at least one processor is further configured to determine whether the timer data indicates that the second permission associated with the second feature for the second subset of the at least one application that is represented within the folder are to be modified; and
to modify the second permission for the second subset of the at least one application that is represented within the folder temporarily, the at least one processor is further configured to modify the second permission associated with the second feature for the second subset of the at least one application that is represented within the folder until the timer data indicates that a specified time threshold is reached, in response to determining that the timer data indicates that the second permission is to be modified.

12. The electronic device of claim 8, wherein the at least one processor is further configured to:
determine that one of the identified set of features is a critical feature;
analyze previous requests to modify one or more of the identified set of features;
select a portion of the identified set of features to include the critical feature and one or more analyzed features that correspond to the previous requests to modify; and
display, on the display of the electronic device, the portion of the identified set of features.

13. The electronic device of claim 8, wherein the at least one processor is further configured to:
receive application data about applications stored on the electronic device; and
generate a cluster of the at least one application, wherein to generate the cluster the at least one processor is configured to:
when the received application data includes at least one selected application, create the cluster to include each of the at least one selected application,
when the received application data includes an application type associated with each of the applications, create a first set of clusters that include each of the at least one application of a similar type, and
when the received application data includes a quantity of times that each of the applications are accessed within a predetermined period, create a second cluster that includes each of the at least one application that is accessed over a predetermined quantity of times.

14. The electronic device of claim 8, wherein at least one feature of the identified set of features is associated with at least one of:
a setting of the electronic device; or
information that is received and is associated with one of the at least one application.

15. A non-transitory computer readable medium embodying a computer program, the computer program comprising computer readable program code that, when executed by at least one processor of an electronic device causes the at least one processor to:
display a folder that includes at least one icon representing at least one application, respectively;
identify a set of features of the electronic device that can be accessed by any of the at least one application represented within the folder, wherein each feature of the set of features is associated with a corresponding permission that enables or disables each of the at least one application represented within the folder from accessing the feature;
receive a request to modify a first permission associated with a first feature of the identified set of features that is accessed by a first subset of the at least one application that is represented within the folder; and
modify the first permission associated with the first feature for the first subset of the at least one application that is represented within the folder based on the received request to modify.

16. The non-transitory computer readable medium of claim 15, wherein the program code when executed at the at least one processor, further causes the at least one processor to:
receive data about a state of the electronic device from one or more sensors of the electronic device;
determine whether to modify a second permission associated with a second feature temporarily based on the received state data; and
in response to determining to modify, modify the second permission associated with the second feature for a second subset of the at least one application that is represented within the folder temporarily.

17. The non-transitory computer readable medium of claim 16, wherein:
the received state data includes location data from a location sensor of the electronic device;
to determine whether to modify second permission temporarily based on the received state data, the program code when executed at the at least one processor, further causes the at least one processor to match a predetermined location to a particular location indicated by the location data; and
to modify the second permission for the second subset of the at least one application that is represented within the folder temporarily, the program code when executed at the at least one processor, further causes the at least one processor to modify the second permission associated with the second feature for the second subset of the at least one application that is represented within the folder while the particular location indicated by the location data matches the predetermined location.

18. The non-transitory computer readable medium of claim 16, wherein:
the received state data includes location data from a location sensor of the electronic device; and
to determine whether to modify second permission temporarily based on the received state data, the program code when executed at the at least one processor, further causes the at least one processor to determine whether timer data indicates that the second permission associated with the second feature for the second subset of the at least one application that is represented within the folder are to be modified; and to modify the second permission for the second subset of the at least one application that is represented within the folder temporarily, the program code when executed at the at least one processor, further causes the at least one processor to modify the second permission associated with the second feature for the second subset of the at least one application that is represented within the folder until the timer data indicates that a specified time threshold is reached, in response to determining that the timer data indicates that the second permission is to be modified.

19. The non-transitory computer readable medium of claim 15, wherein the program code when executed at the at least one processor, further causes the at least one processor to:

determine that one of the identified set of features is a critical feature;

analyze previous requests to modify one or more of the identified set of features;

select a portion of the identified set of features to include the critical feature and one or more analyzed features that correspond to the previous requests to modify; and display, on a display of the electronic device, the portion of the identified set of features.

20. The non-transitory computer readable medium of claim 15, wherein the program code when executed at the at least one processor, further causes the at least one processor to:

receive application data about applications stored on the electronic device; and generate a cluster of the at least one application, wherein to generate the cluster the program code when executed at the at least one processor, further causes at the at least one processor to:

when the received application data includes at least one selected application, create the cluster to include each of the at least one selected application, when the received application data includes an application type associated with each of the applications, create a first set of clusters that include each of the at least one application of a similar type, and when the received application data includes a quantity of times that each of the applications are accessed within a predetermined period, create a second cluster that includes each of the at least one application that is accessed over a predetermined quantity of times.

* * * * *